(12) United States Patent
Miyazawa

(10) Patent No.: US 8,332,743 B2
(45) Date of Patent: Dec. 11, 2012

(54) LAYOUT DECISION METHOD, APPARATUS, AND PROGRAM

(75) Inventor: Hiroyasu Miyazawa, Fuchu (JP)

(73) Assignee: Canon Kabushiki Kaisha, Tokyo (JP)

( * ) Notice: Subject to any disclaimer, the term of this patent is extended or adjusted under 35 U.S.C. 154(b) by 1661 days.

(21) Appl. No.: 11/342,406

(22) Filed: Jan. 30, 2006

(65) Prior Publication Data

US 2006/0174194 A1 Aug. 3, 2006

(30) Foreign Application Priority Data

Jan. 31, 2005 (JP) ................................. 2005-023934

(51) Int. Cl.
*G06F 17/00* (2006.01)

(52) U.S. Cl. ........ 715/230; 715/200; 715/232; 715/233; 715/243; 715/246; 715/273; 715/741; 715/788

(58) Field of Classification Search .................. 715/538, 715/764, 788, 801, 200, 230, 231, 232, 233, 715/243, 246, 273, 741
See application file for complete search history.

(56) References Cited

U.S. PATENT DOCUMENTS

| | | | | | |
|---|---|---|---|---|---|
| 4,558,374 | A | * | 12/1985 | Kurata et al. | 358/453 |
| 5,127,086 | A | * | 6/1992 | Abuyama | 358/1.9 |
| 5,656,402 | A | * | 8/1997 | Kasuga | 430/22 |
| 5,845,303 | A | * | 12/1998 | Templeman | 715/255 |
| 6,411,314 | B1 | * | 6/2002 | Hansen et al. | 715/769 |
| 6,596,032 | B2 | * | 7/2003 | Nojima et al. | 715/247 |
| 6,633,670 | B1 | * | 10/2003 | Matthews | 382/176 |
| 6,826,727 | B1 | * | 11/2004 | Mohr et al. | 715/235 |

(Continued)

FOREIGN PATENT DOCUMENTS

JP A 07-129658 5/1995

(Continued)

OTHER PUBLICATIONS

The above references were cited in a Feb. 5, 2010 Japanese Office Action, which is enclosed without English Translation, that issued in Japanese Patent Application No. 2005-023934.

*Primary Examiner* — William Bashore
*Assistant Examiner* — David Faber
(74) *Attorney, Agent, or Firm* — Cowan, Liebowitz & Latman, P.C.

(57) ABSTRACT

This invention provides a layout decision method, apparatus, and program which can preferably hide a container by performing masking corresponding to a template whose layout is decided in accordance with the size of contents pasted within the container in variable data printing. For this purpose, data are inserted into a plurality of flexible containers (2201, 2202) set in a page to be formed on a print medium. The layout is adjusted at the size of a partial area suitable to draw data to be inserted into the partial area. It is determined whether masking is set for each of the layout-adjusted containers. For the container (2202) having the masking setting, a mask area equal in size to the container is created to cover the container (2202).

12 Claims, 25 Drawing Sheets

U.S. PATENT DOCUMENTS

| | | | |
|---|---|---|---|
| 6,892,201 B2* | 5/2005 | Brown et al. | 1/1 |
| 7,028,255 B1* | 4/2006 | Ayers | 715/202 |
| 7,133,050 B2* | 11/2006 | Schowtka | 345/620 |
| 7,475,242 B2* | 1/2009 | Baird et al. | 713/166 |
| 7,634,725 B2* | 12/2009 | Nishikawa | 715/243 |
| 7,930,632 B2* | 4/2011 | Takashima et al. | 715/243 |
| 2003/0115481 A1* | 6/2003 | Baird et al. | 713/201 |
| 2003/0172343 A1* | 9/2003 | Leymaster et al. | 715/500 |
| 2005/0007382 A1* | 1/2005 | Schowtka | 345/619 |
| 2005/0076290 A1* | 4/2005 | Balinsky | 715/508 |
| 2005/0094206 A1* | 5/2005 | Tonisson | 358/1.18 |
| 2005/0154980 A1* | 7/2005 | Purvis et al. | 715/513 |
| 2005/0162668 A1* | 7/2005 | Noda | 358/1.1 |

FOREIGN PATENT DOCUMENTS

| | | |
|---|---|---|
| JP | 08-077331 A | 3/1996 |
| JP | 11-250271 A | 9/1999 |
| JP | A 2000-222493 | 8/2000 |
| JP | A 2001-101169 | 4/2001 |
| JP | 2002-158861 A | 5/2002 |
| JP | 2003-046745 A | 2/2003 |
| JP | 2003-532949 A | 11/2003 |
| JP | 2004-288028 A | 10/2004 |
| WO | 01/42882 A | 6/2001 |

\* cited by examiner

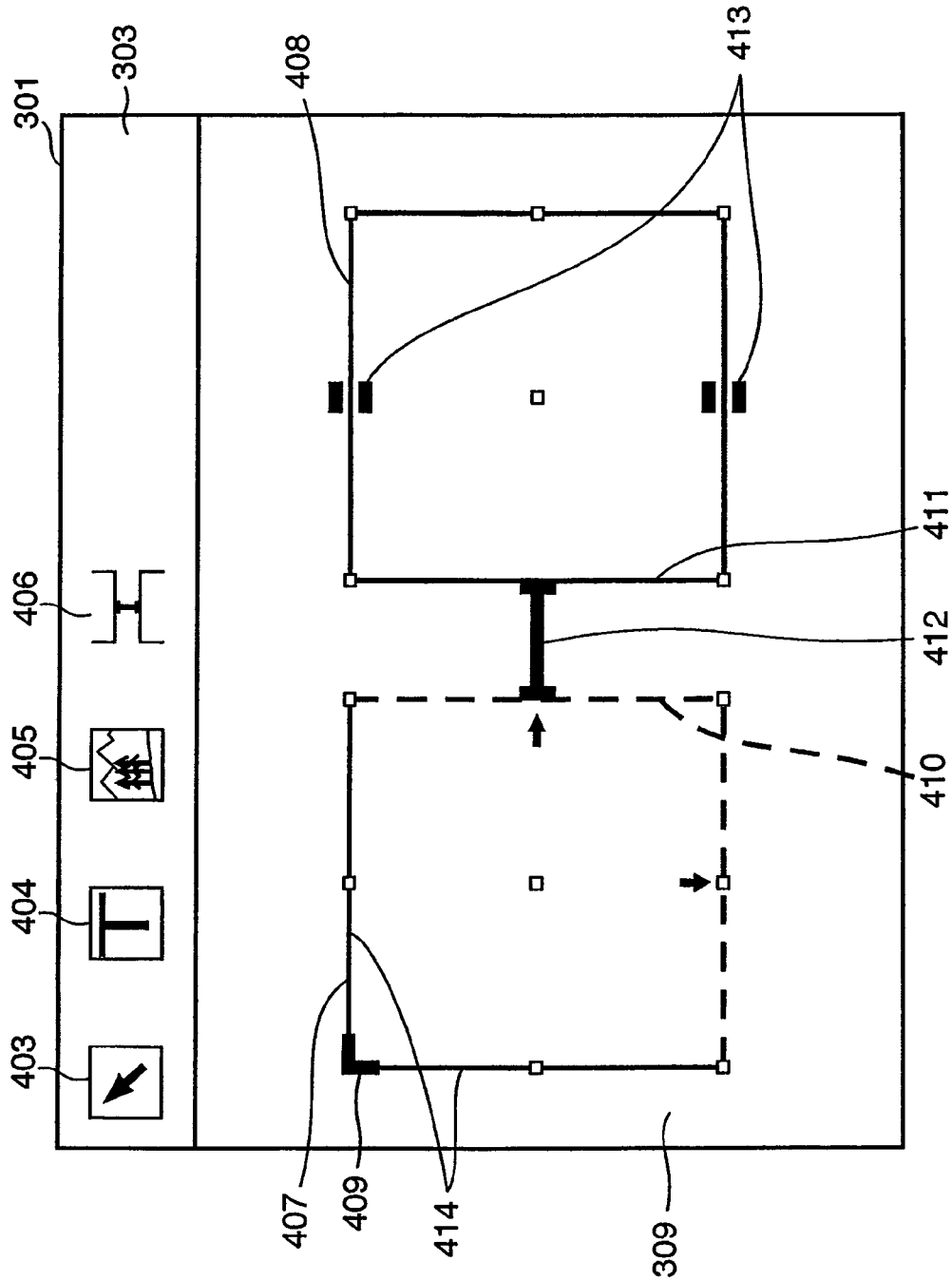

FIG. 7A
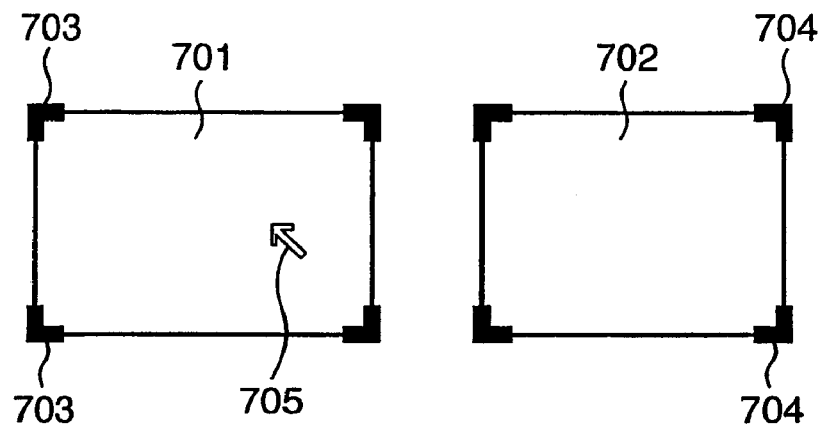
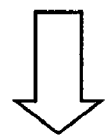
FIG. 7B
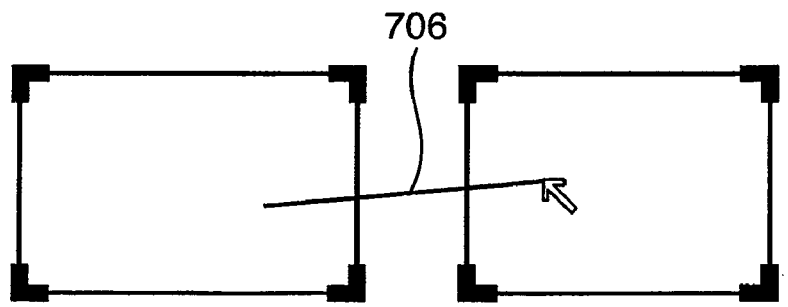
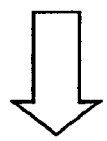
FIG. 7C
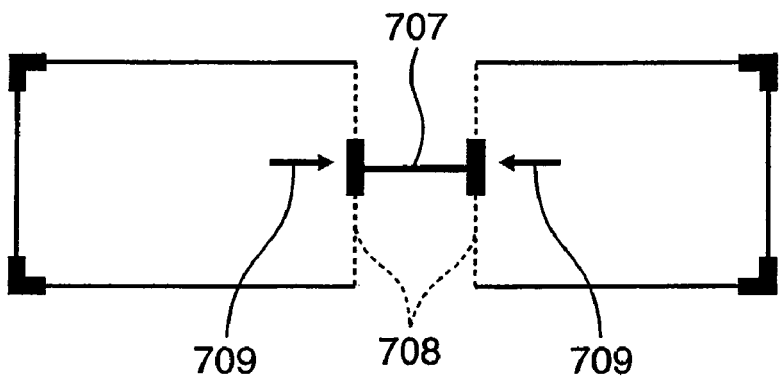

FIG. 10A
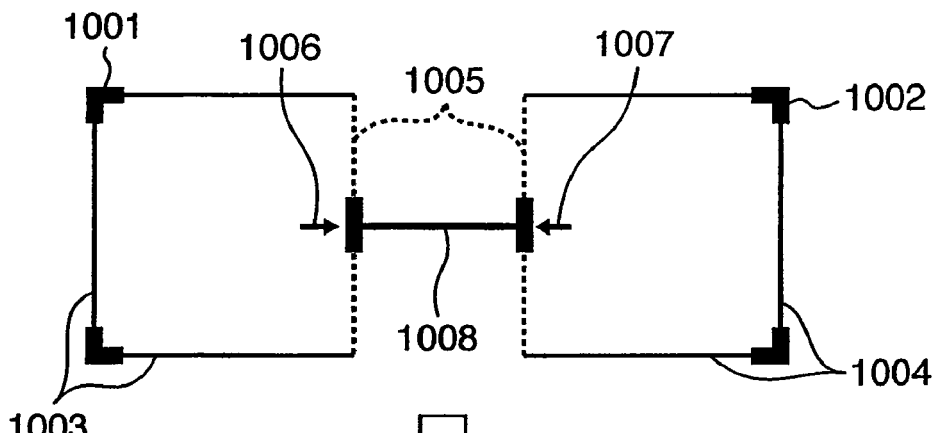
FIG. 10B
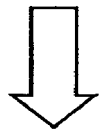
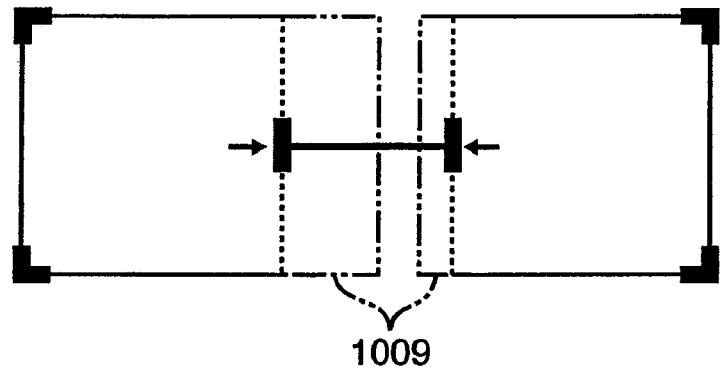
FIG. 10C
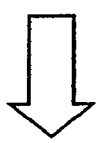
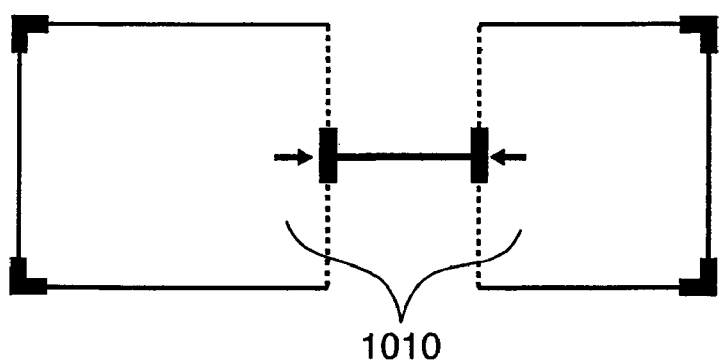

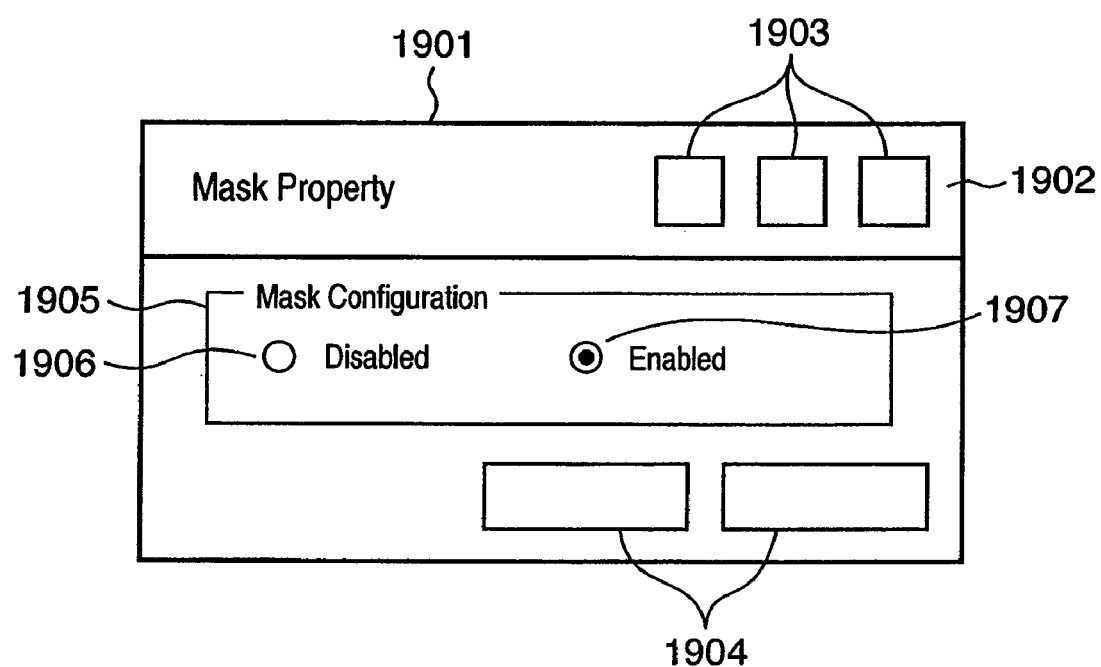
F I G. 19A

LAYOUT DECISION METHOD, APPARATUS, AND PROGRAM

FIELD OF THE INVENTION

The present invention relates to a layout decision method, apparatus, and program which decide the layout of a variable data document made up of a text and image.

BACKGROUND OF THE INVENTION

The necessity for CRM (Customer Relationship Management) and one-to-one marketing has recently received a great deal of attention due to factors such as shortening of the product life as varieties of products are produced, and customer's orientation to customized services as the use of the Internet spreads. These methods are very effective for raising the customer satisfaction, winning new customers, and keeping customers.

One-to-one marketing is a kind of database marketing which creates a database of personal attribute information including the age, gender, hobby, preference, and purchase log of a customer, analyzes the contents of the database, and makes a proposal complying with customer's needs. A typical concrete method of this marketing is variable printing. These days, a variable print system which customizes a document for each customer and outputs it has been developed along with the development of the DTP (Desk Top Publishing) technique and the proliferation of digital printing apparatuses. The variable print system needs to create a customized document in which contents of a different amount for each customer are optimally laid out. For example, the template of a customized document for variable printing can be created by a form creation application as disclosed in patent reference 1 (Japanese Patent Laid-Open No. 2000-222493).

Generally, when such a customized document is to be created by the variable print system, containers are laid out in a document. The container is a drawing area for drawing contents (drawing contents), and is also called a field area. More specifically, a customized document is created by laying out containers in a document and associating a database with the layout (associating contents in the database with the containers). In this specification, such a document is called a variable data document (or simply called a template).

In the variable print system, each laid-out container can receive contents which change for each customer. If the size of data to be inserted into a container is flexible but the container size is fixed, the following problem arises. For example, when text data of a size larger than the container size is inserted, all the text cannot be displayed within the container. When image data of a size larger than the container size is inserted, part of the image is lost. This problem is called overflow.

For example, when contents are image data, the image may be reduced and drawn in the container, but the image may become excessively small. When text data which cannot be fully fitted in a fixed-size container is inserted, the font size of the text may be reduced to display all the text in the container. However, adjustment of the font size may excessively decrease the font size, disturb the balance of the whole document, and make it difficult to read the text.

To solve the above-described problems, there is proposed a technique of flexibly setting text and image layout areas in a document editing application. This technique can flexibly set text and image layout areas. Some document editing applications can make the size of a layout area flexible and increase it in accordance with the data amount input from a keyboard.

There is also proposed a technique of, when text data which exceeds a fixed size is inserted, reducing the font size of the text and displaying all the text within the container.

When, however, the flexible container size increases, the container overlaps another container in the same document. In adjusting the font size to display all the text within a container, the font size becomes excessively small when the amount of text to be displayed is large.

As a technique which solves these problems, a technique associated with a layout design apparatus is known. According to this technique, when the size of a given container increases, the size of an adjacent container is reduced to keep a given interval between them (see, e.g., patent reference 2 (Japanese Patent Laid-Open No. 7-129658 (paragraph 0049, FIG. 8)).

To hide the contents of some containers for security or the like, a technique of displaying the containers by masking is required. As this technique, a document management system is known which masks a document made up of a plurality of papers (see, e.g., patent reference 3 (Japanese Patent Laid-Open No. 2001-101169 (paragraph 0053, FIG. 15)).

However, in patent reference 1 described above, the container size is fixed, and overflow or a free space area occurs. Patent reference 2 is related to a document editing application which simply enlarges a layout area during editing, and highly likely to disturb the layout balance. The document editing application cannot cope with variable printing of extracting data in a data field from a database for each record and inserting (merging) the data. In patent reference 3, masking can be done for only a designated document which is registered in advance as a final output target. No masking can be performed for an output product whose layout is changed for each output target (record), like variable printing. That is, in a variable printing environment where the layout dynamically changes, masking suitable for the layout cannot be implemented, which is inconvenient for the user.

SUMMARY OF THE INVENTION

The present invention has been proposed to solve the conventional problems, and has as its objects to provide a layout decision method, apparatus, and program which can preferably hide a container by performing masking corresponding to a template whose layout is decided in accordance with the size of contents pasted within the container in variable data printing.

According to the present invention, a layout decision method of creating a document by laying out, in a page on the basis of a template, field areas for inserting data of data fields from a record formed from a plurality of types of data fields is characterized by comprising a layout decision step of calculating sizes of the field areas in the template on the basis of amounts or sizes of data of the data fields for each record, and deciding a layout of the calculated field areas in the template, a determination step of determining whether masking setting is made for a field area having the layout decided in the layout decision step, a creation step of, when the masking setting is made for the field area, creating a mask area equal in shape to the calculated field area, and a mask step of covering the field area having the masking setting by using the mask area.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principle of the invention.

FIG. 4 is a view showing an example of typical containers which are displayed in an application window 301 and have a link between the containers, anchors, and sliders;

FIGS. 7A to 7C are views for explaining an example of UI operation when two containers are created and a link is set between them;

FIGS. 10A to 10C are views showing an example of UI display in performing the layout calculation process;

FIG. 19A is a view showing an example of a dialog window 1901 (mask attribute setting window) in which masking information for a container is set;

DETAILED DESCRIPTION OF THE PREFERRED EMBODIMENT

A variable print system according to an embodiment of the present invention will be described in detail below with reference to the accompanying drawings.

Prior to a description of the variable print system according to the embodiment of the present invention, the system configuration and application configuration of the variable print system to which the present invention can be applied will be explained.

<System Configuration>

Figure 1A:
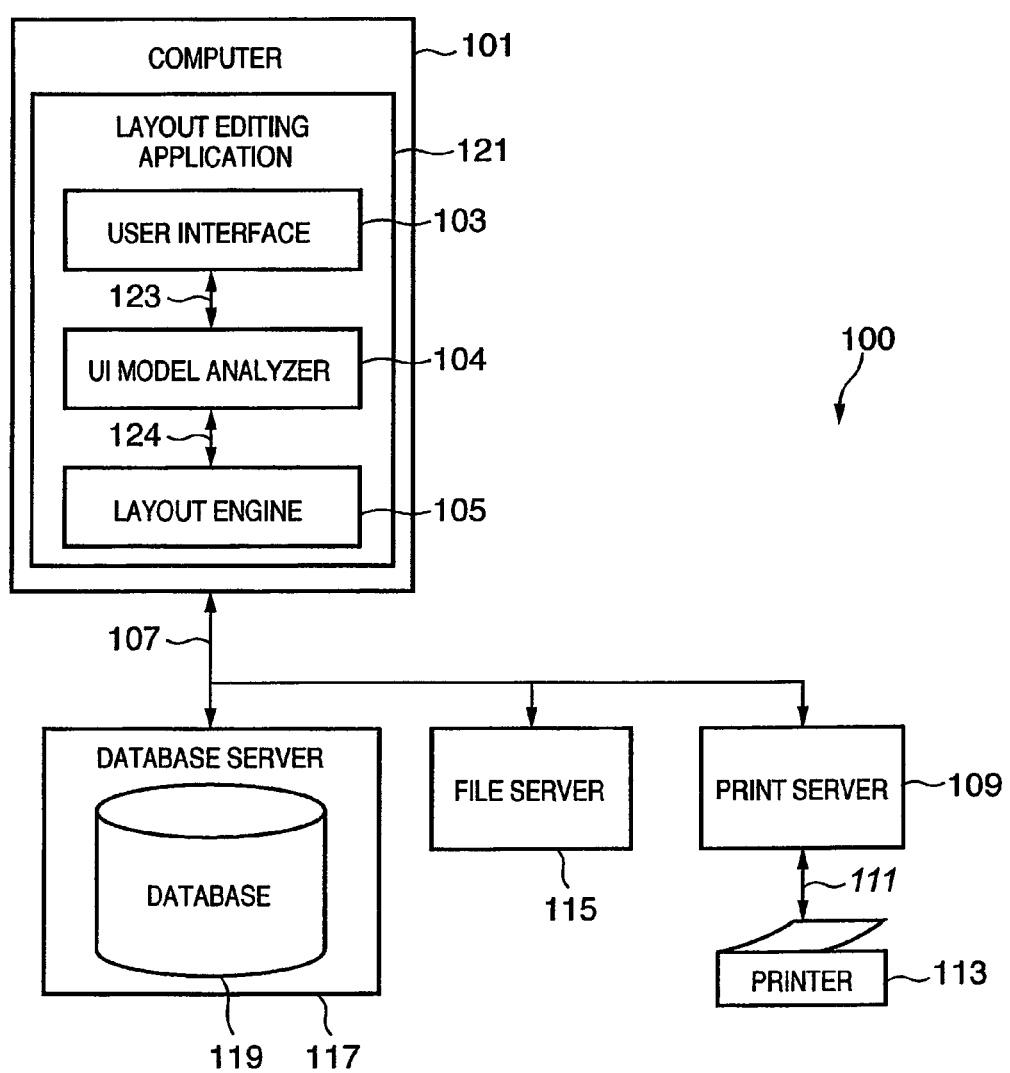
FIG. 1A is a block diagram showing the application configuration of a variable print system 100 which prints a variable data document according to an embodiment of the present invention.
Figure 1B:
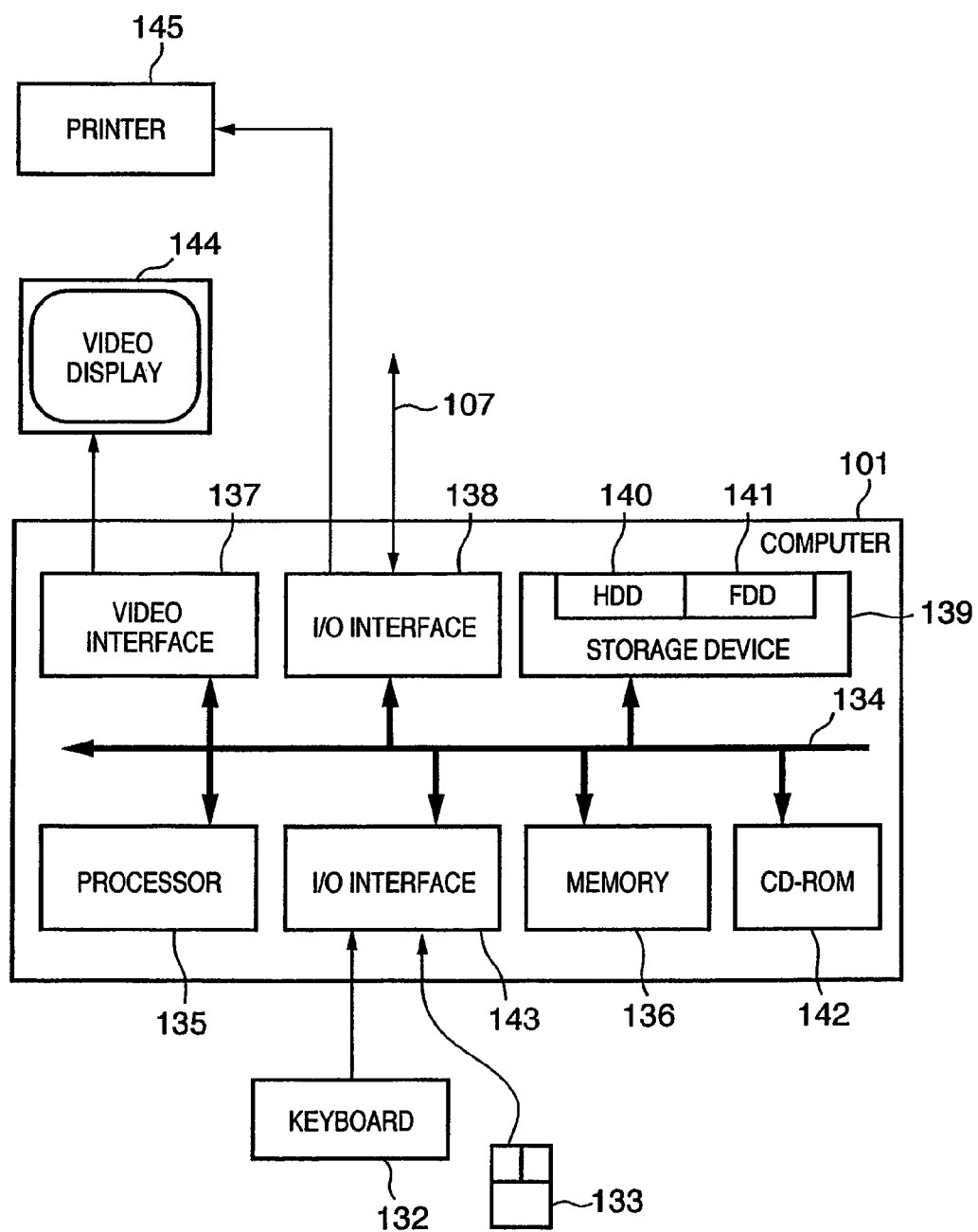
FIG. 1B is a block diagram showing a hardware configuration for implementing the variable print system having the application configuration shown in FIG. 1A.

FIG. 1A is a block diagram showing the application configuration of a variable print system 100 which prints a variable data document according to the embodiment of the present invention. FIG. 1B is a block diagram showing a hardware configuration for implementing the variable print system having the application configuration shown in FIG. 1A. A series of processes to be described below are mainly executed by a general-purpose computer module 101 in FIG. 1B. Processes described with reference to FIG. 1A are executed by all or part of software such as a layout editing application 121 which can run on the variable print system 100.

Especially a layout adjustment/editing step and an accompanying print step are done in accordance with an instruction from software executed by the computer 101 (corresponding to a layout decision apparatus according to the present invention). Software is stored in a computer-readable storage medium including a storage device to be described later. The software is executed by loading it from the computer-readable storage medium to the computer 101. The software and the computer-readable storage medium having a computer program recorded on it are computer program products. The use of the computer program products in the computer is desirably advantageous to layout editing and variable data printing of a document.

The computer 101 is connected to input devices such as a keyboard 132 and a pointing device (e.g., a mouse 133), and connected to output devices such as a display device 144 and a printer 145 which becomes local depending on the situation. An input/output (I/O) interface 138 can connect the computer 101 to a network 107, and connect the variable print system 100 to another computer or the like. Typical examples of the network 107 are a local area network (LAN) and wide area network (WAN).

The computer 101 typically comprises at least one processor unit 135, a memory unit 136 formed from a semiconductor random access memory (RAM) or read only memory (ROM), a video interface 137, an input/output (I/O) interface, and an I/O interface 143 for the keyboard 132 and mouse 133.

The computer 101 comprises a storage device 139 including a hard disk drive (HDD) 140 and Floppy® disk drive (FDD) 141. Although not shown in FIG. 1B, a magnetic tape drive can also be used. In FIG. 1B, a CD-ROM drive 142 is provided as a nonvolatile data source.

The computer 101 utilizes the components 135 to 143 of the computer module 101 that communicate with each other via an interconnection bus 134 by an operating system such as GNU/LINUX or Microsoft Windows®, or a method in a conventional operation mode of a computer system that typically complies with an operating system or is formed by a well-known related technique.

Conceivable examples of the computer shown in FIGS. 1A and 1B are an IBM-compatible PC, Sparc Station available from Sun, and a computer system including them.

The layout editing application program 121 shown in FIG. 1A is resident in the typical hard disk drive 140, and is executed, loaded, and controlled by the processor 135. Data fetched from the intermediary storage device of the layout editing application program 121 and the network 107 use the semiconductor memory 136 in response to the hard disk drive 140. For some instances, the layout editing application program 121 is encoded in a CD-ROM or Floppy® disk, loaded via the corresponding HDD 140 or FDD 141, and provided to the user.

As another example, the layout editing application program 121 may be loaded by the user from the network 107. The software can also be loaded into the computer 101 from a computer-readable storage medium of a proper size. The computer-readable storage medium includes a magnetic tape, a ROM, an integrated circuit, and a magneto-optical disk. The medium includes radio communication, and infrared communication between the computer module 101 and another device. The medium also includes a computer-readable card such as a PCMCIA card. Further, the medium includes e-mail communication, an intranet, and the Internet having recording information on a WEB site. These media are examples of the computer-readable medium, and another storage medium may also be used.

As shown in FIG. 1A, the layout editing application 121 designates variable data printing (VDP), and includes three software components.

The first component is a layout engine 105. The layout engine 105 is a software component for calculating the positions of a rectangle and lines in accordance with limitations and sizes within a rectangular range. The second component is a user interface 103 which provides a mechanism of prompting the user to create a document template and associating a container in the document template with a data source. The third component is a UI model analyzer 104 which converts a container or user interface element (e.g., an anchor, slider, or link) provided by the user interface 103 into an internal format that can be recognized by the layout engine 105. In other words, the UI model analyzer 104 can easily replace the user interface 103 with a user interface of another display/input format without changing the layout engine 105.

The user interface 103, UI model analyzer 104, and layout engine 105 communicate with each other via communication channels 123 and 124. A data source for generating a document is a typical database 119 in a database server 117 which generally executes a database application and is formed from another computer.

The computer 101 communicates with the database server 117 via the network 107. The layout editing application program 121 for variable data printing generates a document template to be saved in the computer 101 or a file server 115 which is generally formed from another computer.

The layout editing application 121 for variable data printing generates a document which is formed from a document template merged with data. The document is saved in the local file system of the computer 101 or the file server 115, or directly output to a printer 113 and printed.

A print server 109 is a computer which provides a network function to a printer not directly connected to the network 107. The print server 109 and printer 113 are connected via a typical communication channel 111.

Figure 2:
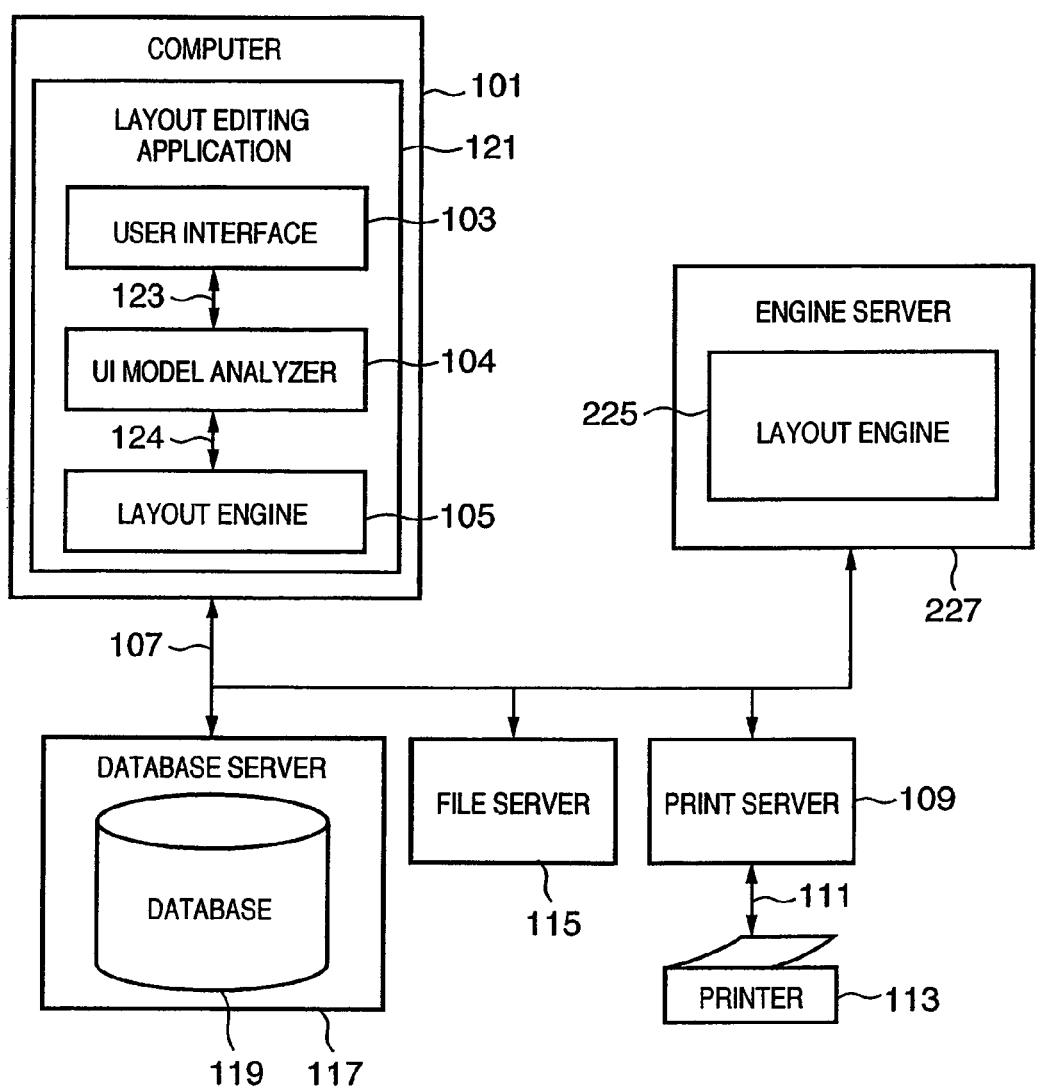
FIG. 2 is a block diagram showing the configuration of a variable print system obtained by newly adding an engine server 227 to the variable print system shown in FIG. 1A.

FIG. 2 is a block diagram showing the configuration of a variable print system obtained by newly adding an engine server 227 to the variable print system shown in FIG. 1A. The engine server 227 shown in FIG. 2 is a typical computer. A document template saved in the file server 115 can be combined with data saved in the database 119 in order to generate a document by a layout engine 225 for printing or another purpose. Such operation is requested via the user interface 103 or requested to print only a specific record.

<Application Configuration View>

The application configuration of the variable print system to which the present invention can be applied will be explained.

[Main Window]

Figure 3:
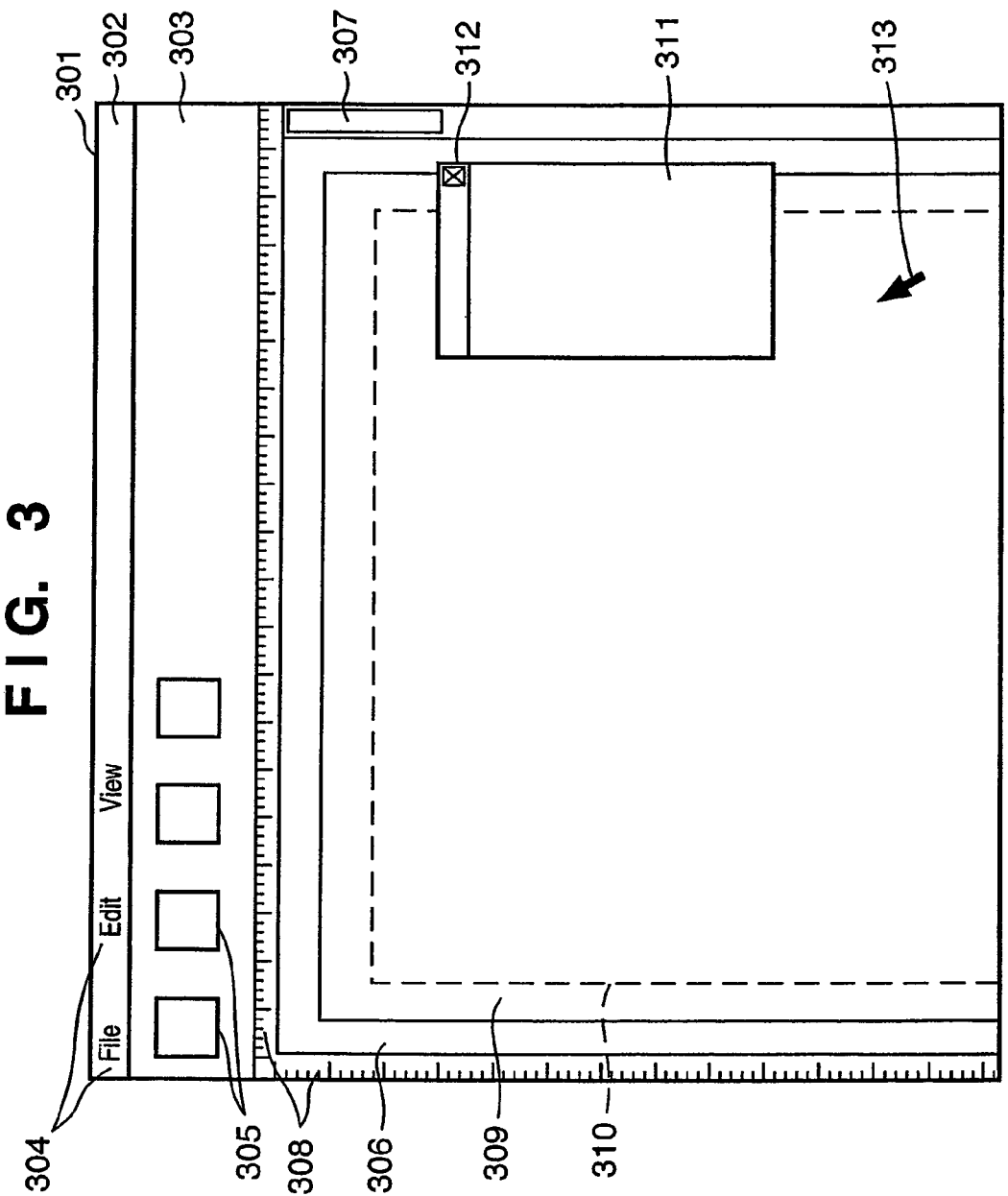
FIG. 3 is a view showing the main window of a layout editing application 121 that is displayed on a video display 144 of a computer 101 and includes a menu bar, tool bar, work area, and floating palette according to the embodiment of the present invention.

FIG. 3 is a view showing the main window of the layout editing application 121 that is displayed on the video display 144 of the computer 101 and includes a menu bar, tool bar, work area, and floating palette according to the embodiment of the present invention. As shown in FIG. 3, the user interface 103 includes a user interface which is formed by an application window 301 displayed on the video display 144 upon operation.

The window 301 is characterized by a menu bar 302, tool bar 303, work area 306, optional palette 311, and cursor/pointer 313. The menu bar 302 and tool bar 303 can be hidden or moved to various locations on the screen. The location of the work area 306 can be moved by the position and operation of the mouse 133.

As a known technique, the menu bar 302 has many menu items 304 expanded below the layer of a menu option. The tool bar 303 has many tool buttons and widgets 305 which can be hidden or displayed in a special mode of the application.

In the application window 301, an optional ruler 308 is used to indicate the position of a pointer, page, line, margin guide, container, or object in the work area 306.

The palette 311 is used to access an additional function such as a variable data library. For this purpose, the palette 311 has a window control button 312 for moving, resizing, and closing the palette 311. The palette 311 can be displayed as an option on the front surface of the work area 306 or hidden on the back surface of an object. The palette 311 is limited to be displayed only within the application window 301, or permitted to be displayed partially or entirely outside the application window 301.

FIG. 4 is a view showing an example of typical containers which are displayed in the application window 301 and have a link between the containers, anchors, and sliders. In FIG. 4, the tool bar area 303 has at least "buttons" which can be selected by the user.

(1) Selection Tool Button 403

A selection tool button 403 is used to select, move, resize, and lock/unlock the edge of a container. A plurality of containers can be selected by dragging a selection box around them, or keeping pressing the CTRL key while selecting them.

(2) Text Container Tool Button 404

A text container tool button 404 is used to create a container having a static or variable text.

(3) Image Container Tool Button 405

An image container tool button 405 is used to create a container having a static or variable image.

(4) Link Tool Button 406

A link tool button 406 is used to create a link for controlling the distance between containers.

As a known technique, these buttons are implemented as tool tips of icons which change in accordance with an operation status.

[Document Template]

The work area 306 is used to display and edit the design of the document template. The work area 306 can present an outline of a document to be printed to the user while the user designs an outline of a preliminarily printed document. A document template to be created has a layout desired by the user. A calculated layout changes between records because the system dynamically decides the layout in accordance with the amount and size of content data. From a comparison between the document template and the preview after dynamic layout calculation, the user can understand how a document merged with the data source (190) changes depending on the amount and size of variable data. For example, when an external data source is linked to a template, variable texts and images are displayed in containers so as to preview a current document.

A document structure and visual clues for drawing a variable data container are always displayed when the cursor is moved onto a container or a container is selected.

As shown in FIG. 3, the work area 306 is characterized by a scroll bar 307, the optional ruler 308, and a document template 309. The document template 309 can show that a document has a plurality of pages. The page size of the provided document template 309 is designated by the user by a known technique. The number of actual pages of each document may change depending on variable data. When variable data cannot be fitted in one page, an additional page is automatically created. A boundary in each page is indicated by an arbitrary page margin 310 which represents the maximum width of a printable object on the page.

For example, as shown in FIG. 4, objects which can be displayed in the document template 309 for one page are two containers 407 and 408, an arbitrarily applied anchor icon 409, an unfixed edge 410 displayed as a broken line, fixed edges 411 and 414 displayed as solid lines, a link 412 which links the two containers, and a slider 413.

[Container]

A container is a space having a fixed or flexible text/image in the document template, and is laid out with other containers and objects. The container is resized and created again by operating the mouse 133 and moving the pointer 313 as represented by a user interface.

More precisely, the container has container attributes representing the position, the maximum, minimum, design sizes, the maximum and minimum font sizes of contents to be merged, and whether each edge is fixed/flexible. All the definitions of the container attributes will be described.

(1) A container has fixed or flexible contents. Flexible contents are dynamic in the sense that data is inserted from the data source and the data size may change for each document. Flexible contents are not intended to include contents which change or are animated in a time during which printing is impossible. Fixed contents are displayed in the same way for all documents generated using containers. However, fixed contents may change in display position in each document depending on the operation of a flexible container. Contents to be merged with containers change between records, and the display contents also change.

(2) A container has ornament functions similar to text settings such as the background color, border, and font style which are applied to contents.

(3) A container is merged with data from the data source when a document is generated. The ornament function is visible on a typical printout for any fixed contents. Flexible contents provide display of specific data from the data source. This representation of the container can be, for example, printed and/or displayed on the screen 144.

(4) A container has a user interface such as an interactive GUI for editing a container and making display settings. Interface components are generally displayed on the screen 144, but are not printed in a document. The user interface 103 displays some of the container ornament functions such as the background color and font. The user interface 103 adds a function of permitting editing and display of container settings. Examples of special purposes of the user interface function are a border, or a corner icon for interactively changing and displaying the size and position of a container, an overwrite count representing container operation when a container is merged with data from the data source, a line, an icon, and a text. One of currently released outlines is a set of a new direct editing technique and a display method accompanying the GUI components of a container.

[Container Constraints]

As a known technique, a container has constrains on controlling how to link contents displayed in each document. These constraints (including linking of fixed/flexible contents to a container) are a major method of controlling generation of many documents from one document template by the user. An example of the constraints is "the height of contents in this container is 4 inches at maximum." Another example of the constraints is "the left edge of contents in the container must be displayed at the same horizontal position in respective documents." A method for display, editing, and the like under these constraints by using the GUI will be described.

A content place holder which designates the layout of fixed contents, like an image which holds a defined place on a page, is well known in the digital printing technique. A container holds a position and size, which are edited and displayed by a method known in a conventional technique. The description of the embodiment is focused on display and editing by a layout adjustment method specialized in variable data printing.

A container allows the user to designate the size and position of contents in a document. Since some documents are generated from one document template, the container must use a user interface in order to designate and display many possibilities and constraints.

The edge of one container defines a virtual boundary within which associated contents are displayed in a document. Hence, a discussion about the left edge of a container in the embodiment is a discussion about the leftmost edge in an area in which associated contents can be displayed in each document. Similarly, a discussion about the height of a container is understood to be a discussion about constraints on the height of associated contents in a generated document. In the embodiment, this distinction will become apparent when the edge or size of a container is discussed by referring to the user interface 103.

In the following examination, the term "fixed" which defines some values used to constrain display of contents applies to all documents.

For example, when the width of a container is fixed, a width assigned to associated contents is equal in all documents. When the height of a container is fixed, a height assigned to associated contents is equal in all documents. When the distance constraint is fixed, a designated distance acts as a constraint in all documents. When the right and left edges of a container are fixed, the horizontal positions of the edges in a page are identical in all documents. However, the height or vertical position of a container may change. For example, when the left edge of a container is fixed, associated contents may be displayed at an upper portion on a page in a given document and at a lower portion on a page in another document, but the horizontal position of the left edge is identical in all cases.

When the upper and lower edges of a container are fixed, the vertical positions of the edges in a page are identical in all documents. However, the width or horizontal position of a container may change.

The vertical axis of a container is a virtual vertical line which is parallel to the right and left edges of the container and positioned between them. If the vertical axis of a container is fixed, the average of the horizontal positions of the right and left edges of the container is identical in all documents. Under this constraint, the width of a container may change. The right and left edges are the farthest from or the closest to the vertical axis in different documents. However, the vertical axis is at the same horizontal position in all documents. The height and vertical position of a container are not influenced by this constraint.

Similarly, if the horizontal axis is fixed, the upper and lower edges of a container are vertically positioned. However, the height of a container is not influenced by this constraint.

When both the horizontal and vertical axes are fixed, this means that the center position of a container is fixed. However, the width and height of a container are not influenced by this constraint.

When a corner of a container, an intermediate position of the edge of the container, or the center position of the container is fixed, the container is displayed at the same position associated with the container in all documents. For example, if the upper left corner of a container is fixed, this means that the upper left position of a laid-out container is identical in all documents.

The vertical edge or axis of a container is fixed in association with the left or right edge of a page, a left or right page margin, or another horizontal position. Similarly, the horizontal edge or axis of a container is fixed in association with the upper or lower edge of a page, a margin, or another vertical position. Variations of the term "fixed" become important only when the page size changes between documents because, when the page size is identical in all documents, the possibility of fixed portions is equal in document generation.

Note that a term opposite to "fixed" is "flexible" which means that an edge, axis, corner, intermediate position, or document constraint may change between documents. However, a document need not always be made flexible depending on its specific settings. For example, there is another external constraint such as an actually preferable position of an edge upon a change. If no external constraint is applied, the edge position can be changed because it is labeled that no edge is fixed.

[Display and Editing of Container]

Method of Creating New Container

A container is described as either of two, text and image containers. The text container can have text data and image data to be embedded. The image container can have only image data.

As shown in FIG. 4, a new text container or image container is created on the document template 309 by clicking the text container tool 404 or image container tool 405 with the mouse 133 and dragging a rectangle onto the template 309.

Alternatively, a container is simply created by making the appropriate text container tool 404 and image container tool 405 active and clicking on the document template 309. Then, a container of a default size is inserted, or a dialog box or another prompt for setting the dimensions of the new container is provided. Some containers are automatically defined in advance, or created and laid out by a calculated schema. Another method is also conceivable.

Container Display Method

It is preferably made possible to draw an edge in the work area 306 by a graphical representation. In this case, the states of some edges may share their representations in some situations, and graphical representations may become smaller in number than the above-described ones.

FIGS. 5A to 5D are views for explaining typical container rules according to the embodiment of the present invention. FIGS. 5A to 5D illustrate model edge rules of a container.

The application 121 draws an edge in a solid line 503 or dotted line (broken line) 504 in order to express the state of the edge. The application 121 also has, as features, anchors (lines, shapes, or icons as represented by 506, 507, and 509 drawn near edges), handles (control points drawn near edges or shapes for movement and modification) 502, the slider 413 (short parallel lines drawn on the two sides of an edge), a scaling icon 505, and the color.

The rules of the container display method shown in FIGS. 5A to 5D are as follows.

1. In order to fix each edge, the edge is drawn in a solid line.
2. When the width of a container is fixed, the right and left edges are drawn in solid lines.
3. When the height of a container is fixed, the upper and lower edges are drawn in solid lines.
4. No axis is drawn.
5. Scaling icons are drawn near edges which have not been drawn yet, and these edges are drawn in dotted lines (broken lines).
6. If a pair of a vertical edge and a horizontal axe is fixed, an anchor is drawn at the intersection.
7. If no anchor is drawn on any fixed edge, a slider is drawn at the center of the edge.
8. If neither anchor nor slider is drawn on a pair of a vertical edge and a horizontal axe, a handle is drawn at the intersection.

Lines defined by rules 1, 2, and 3 are drawn in solid lines when they are fixed or restricted. A flexible line defined by rule 5 is drawn in a broken line. Anchors are displayed at fixed points defined by rules 6, 7, and 8, sliders are displayed on several fixed edges, and handles are displayed for other components.

According to the above rules, each edge must be drawn only once. If a rule influences an edge to be drawn, the subsequent rules do not influence the edge to be drawn again. For example, when a container is so small that icons overlap each other or another display function becomes obscure, the icons may be changed or omitted in drawing edges.

The location where a flexible edge is drawn depends on the contents of a container. As will be described later, a "dynamic calibration process" is employed which means that contents are merged into a document template and visualized on a user interface. An alternative execution means can be used by another means for deciding where a flexible edge is laid out in a user interface or in the content area of a container averaged in all documents.

These content representations provide a graphic means for displaying the state of a container edge. The representations are interpreted as follows.

A broken line means an edge in a document that changes depending on the contents of a container, like the right edge 410 of the container 407 in FIG. 4. A solid line means a restricted edge. For example, the edge 414 drawn in a solid line represents a fixed edge. The container 408 shows that its width and height are fixed because all the edges are fixed.

An anchor means that a location where edges or axes cross each other is fixed. Anchor points appear at horizontal and vertical positions in all documents, and anchors are naturally fixed. The icon 409 in FIG. 4 is an example of the anchor icon meaning that the crossing edges 414 are fixed.

A slider displayed with a container means that an associated edge is fixed. In each container, the slider can be set at the center of an edge or various positions along the edge. For example, the slider 413 in FIG. 4 represents that the contents of the container 408 may be displayed on the left or right side of a position where the contents of the container 408 are given by a specific diagram in a document.

Some or all of these icons and edges are drawn or are not drawn depending on which of tools and containers is selected, highlighted, or made active. Generally, the edges and icons of a container only assist designing a document template, and are not drawn on a printed material.

Settings of the minimum and maximum values of the width and height are displayed in a secondary dialog window.

Figure 5A:
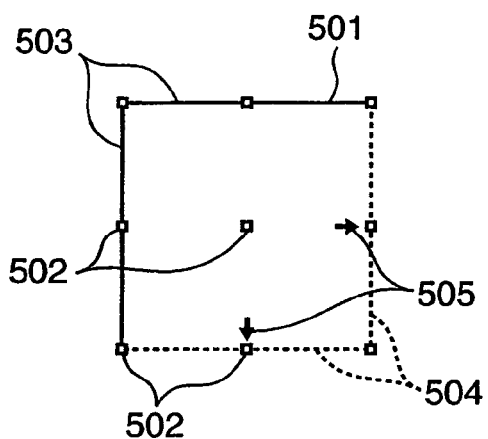
FIGS. 5A to 5D are views for explaining typical container rules according to the embodiment of the present invention.

In FIG. 5A, neither the width nor height of a container 501 is fixed. That is, a fixed edge 503 of the container 501 is represented in a solid line, and a flexible edge 504 is represented in a dotted line (broken line). A scaling icon 505 is an additional or alternative indicator representing that the adjacent edge 504 is flexible.

Figure 5B:
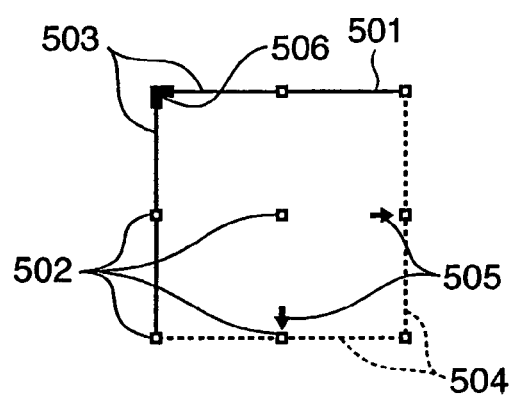

In FIG. 5B, both the width and height of the container 501 are flexible. The anchor icon 506 additionally or alternatively represents that two crossing edges 503 are fixed. To the contrary, no anchor icon is set on the edges 504.

Figure 5C:
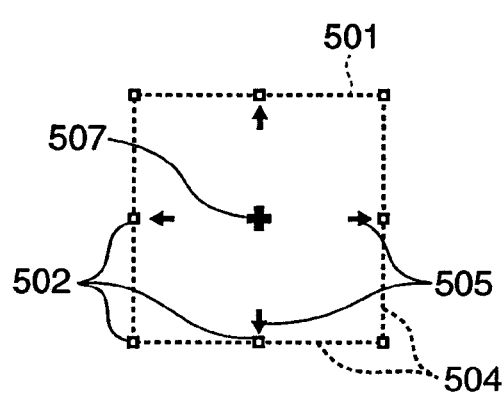

In FIG. 5C, both the width and height of the container 501 are flexible so that the container 501 can be equally enlarged or reduced in directions around the central point, as indicated by an arbitrary anchor icon 507.

Figure 5D:
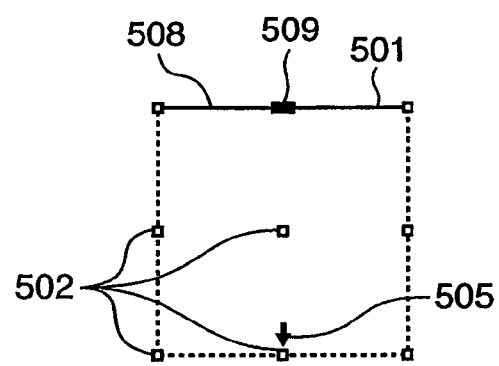

In FIG. 5D, both the width and height of the container 501 are flexible except that an upper edge 508 is fixed. The anchor icon 509 positioned at the center of the upper edge 508 represents that the upper edge 508 is fixed. The left and right edges of the container 501 move apart from or close to a center axis (vertical axis) which is virtually drawn to pass through the center of the upper edge 508.

[Link]

A link indicates association between containers. The association represents the distance between containers, and containers associated by a link execute layout calculation upon a change in their layouts. For example, reference numeral 412 in FIG. 4 denotes a link. In FIG. 4, the link 412 associates the containers 407 and 408 with each other. The link setting method and the layout calculation method for containers associated by a link will be described later.

[Link Setting Method]

Figure 6:
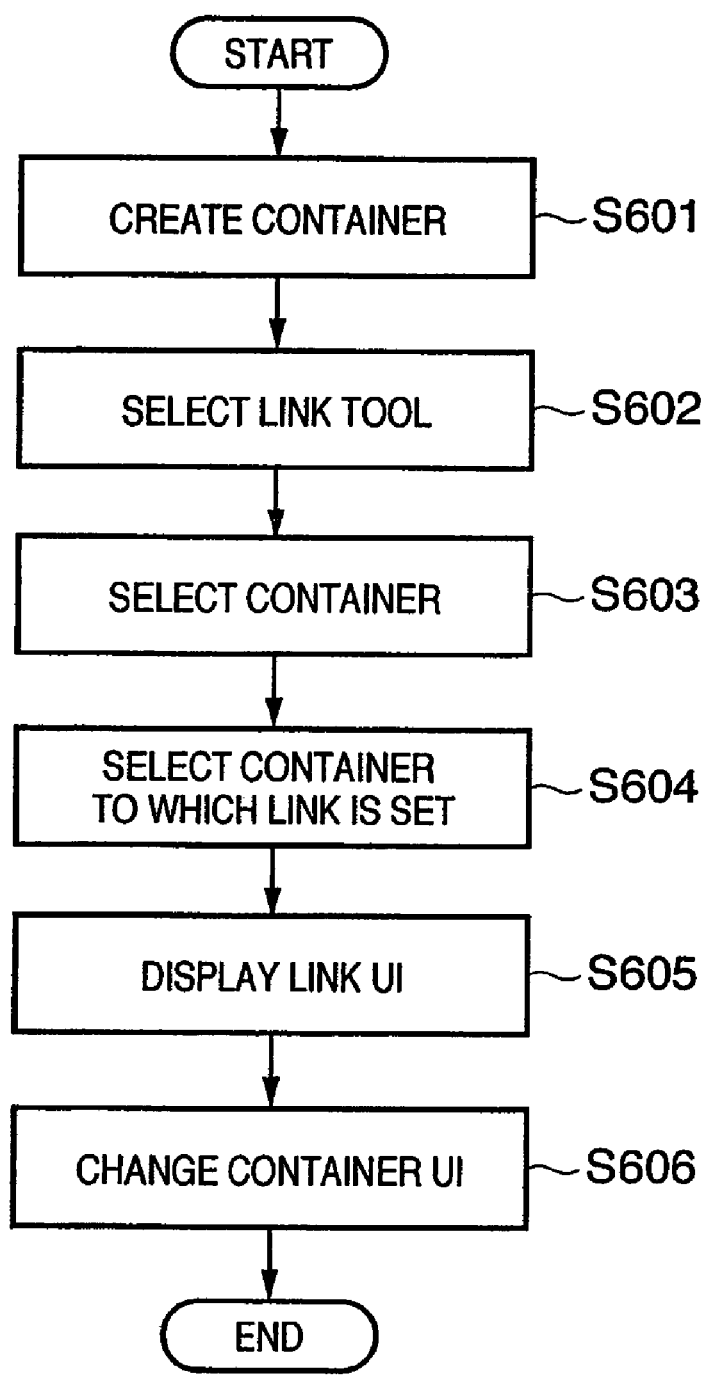
FIG. 6 is a flowchart for explaining a link setting process according to the embodiment of the present invention.

FIG. 6 is a flowchart for explaining a link setting process according to the embodiment of the present invention. FIGS. 7A to 7C are views for explaining an example of UI operation when two containers are created and a link is set between them. A process procedure of setting a link between containers will be explained with reference to FIGS. 6 and 7A to 7C.

In order to set a link, (at least two) containers for setting a link are created (step S601). FIG. 7A shows an example of two containers created in step S601. Edges 701 and 702 are fixed, similar to the above-described edges 407 and 408 shown in FIG. 4. Anchors 703 and 704 have the same anchor icons as that of the anchor 409 in FIG. 4. Reference numeral 705 denotes a mouse pointer.

The link tool 406 is selected (step S602). One container (e.g., the container 701 in FIG. 7A) for which a link is to be set is clicked with the mouse and selected (step S603). As shown in FIG. 7B, the mouse pointer 705 is moved to the other container (e.g., the container 702 in FIG. 7A) to select it (step S604). Reference numeral 706 in FIG. 7B denotes a straight line which links a position designated by clicking with the mouse pointer 705 in the state shown in FIG. 7A and a position of the mouse pointer 705 after movement. The straight line 706 is a UI which presents to the user a position where a link is to be set.

After the process in step S604 ends, a link UI 707 is displayed at a set location (step S605). Then, the container changes to a state shown in FIG. 7C. Upon setting the link, the container UI automatically changes (step S606). In FIG. 7C, an edge 708 is drawn in a dotted line (broken line), and is a flexible edge, as described above. A container edge which is fixed in FIG. 7A changes to a flexible one as shown in FIG. 7C because the container edge must be made flexible in response to setting the link 707. This process is automatically executed to prevent a contradictory state in which all edges are fixed though a link is set.

In FIG. 7C, a scaling icon 709 is identical to the scaling icon 505 shown in FIGS. 5A to 5D, and visually presents to the user a direction in which a container can change upon setting a link. In the example of FIG. 7C, the right edge of the left container 701 and the left edge of the right container 702 change to be flexible, but this is merely an example. The right container 702 may change to a setting having a slider such as the slider 413 in FIG. 4.

[Layout Calculation Method (Overall Flow)]

Figure 8:
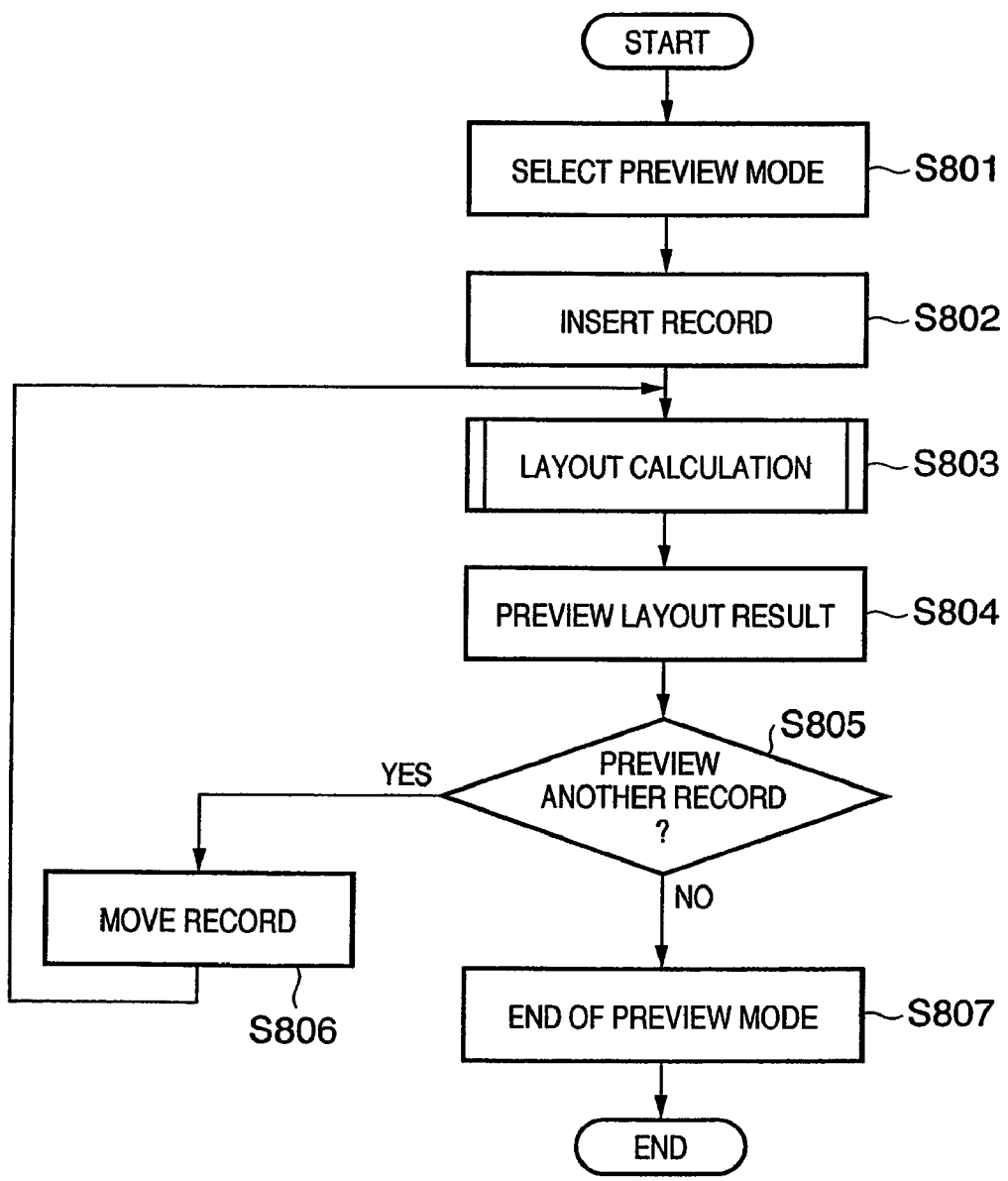
FIG. 8 is a flowchart for explaining control of a layout calculation process in the layout editing application 121 according to the embodiment of the present invention.

FIG. 8 is a flowchart for explaining control of a layout calculation process in the layout editing application 121 according to the embodiment of the present invention. This control flow explains a method of inserting (merging) the contents of each record from the database 119 into a document template, and dynamically calculating the layout in accordance with the container attributes and the amount and size of each content. This flowchart describes control executed by the layout engine 105 of the layout editing application 121 using the processor 135 and memory 136.

When a preview mode is selected, the layout editing application 121 starts the process (step S801). The above-described control in FIG. 6 is an operation in a layout mode in which the layout of a document template is created by creating at least two containers and associating them to each other by an automatic layout system. The control in FIG. 8 starts by executing the preview mode in which a record is inserted into the layout created in FIG. 6 and a layout result after actually inserting the record is previewed. In step S801, the preview mode is selected, and an actual record is inserted to calculate the layout. In the preview mode, a layout for display is calculated. Also in actual printing, a record is inserted to calculate the layout. A calculation method in printing is also the same as that in the preview mode.

After the preview mode is set, the layout editing application 121 selects and inserts a record to be previewed (step S802). When the user designates a specific record, the designated record is inserted. If the user does not designate any record, calculation starts sequentially from the first record. After the record is inserted in step S802, the layout editing application 121 performs calculation for laying out the record (step S803). Details of layout calculation will be described with reference to FIG. 9. The layout editing application 121 displays the layout calculated in the process of step S803 (step S804). The layout editing application 121 also determines whether to preview another record (step S805).

If the layout editing application 121 determines not to preview another record (NO in step S805), the preview mode ends (step S807). If the layout editing application 121 determines to preview another record (YES in step S805), it selects another record, moves it, calculates the layout again, and previews the record (step S806). In the print mode, unlike the preview mode, the layout is calculated by the same procedure as the described one sequentially for all records to be printed. In this case, steps S805 and S807 in the flowchart shown in FIG. 8 are omitted, and the process ends at the end of printing all records.

[Layout Calculation Method (Detailed Flow)]

Figure 9:
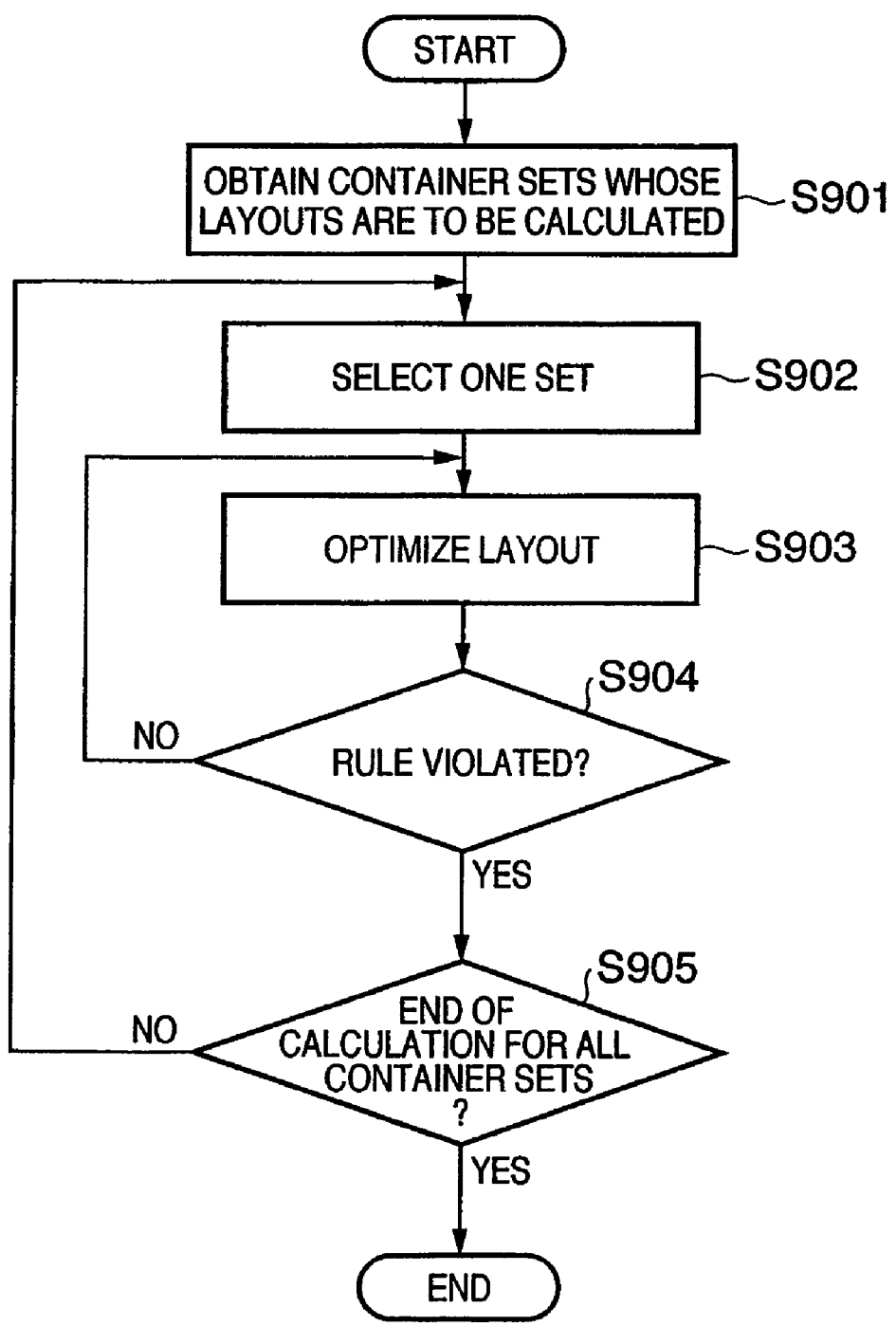
FIG. 9 is a flowchart for explaining details of the layout calculation process (step S803) shown in FIG. 8.

FIG. 9 is a flowchart for explaining details of the layout calculation process (step S803) shown in FIG. 8.

The layout editing application 121 obtains container sets whose layouts are to be calculated (step S901). The following layout calculation is done for associated containers as one set.

Figure 11:
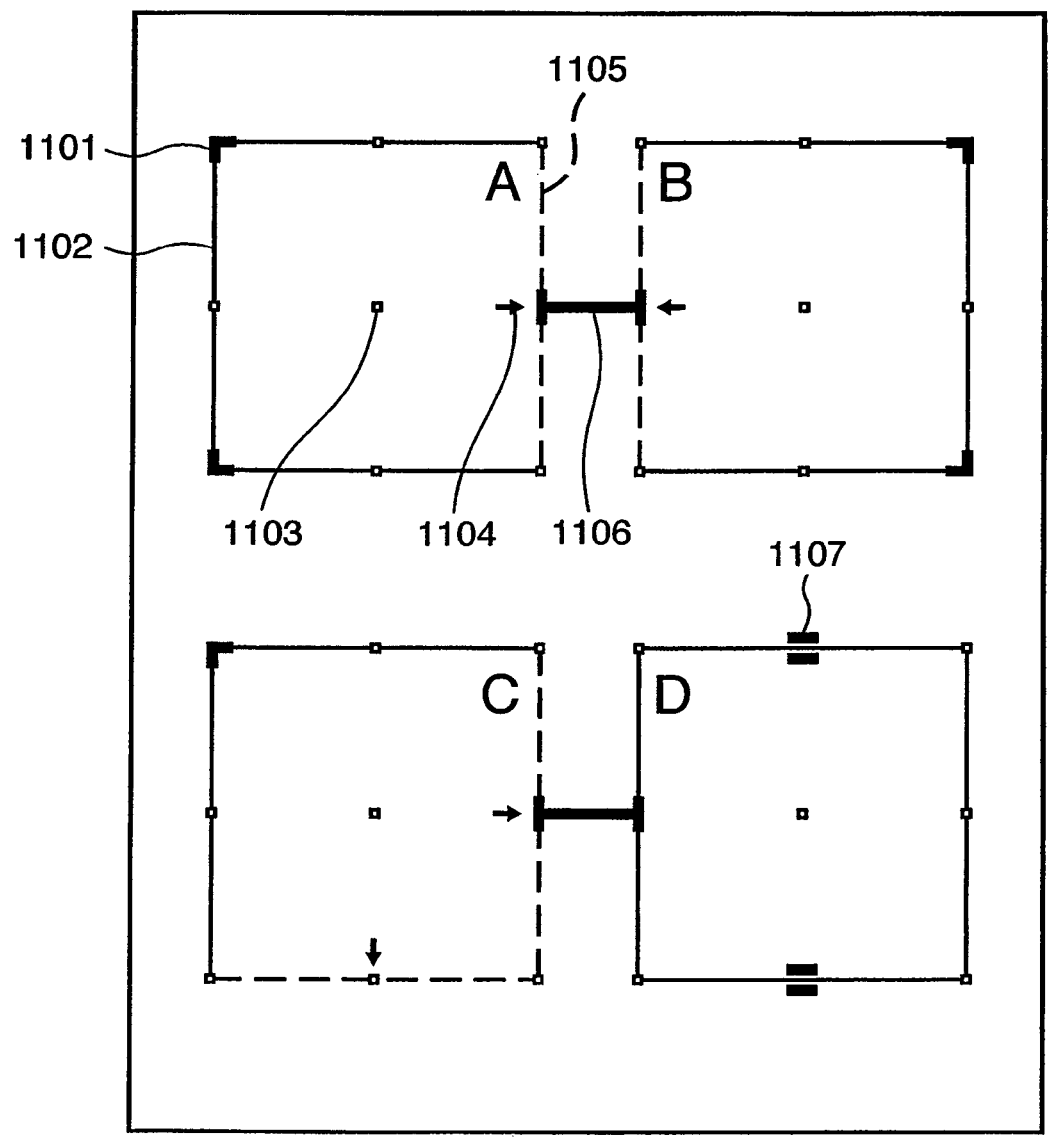
FIG. 11 is a view for explaining a container set in layout calculation according to the embodiment of the present invention.

FIG. 11 is a view for explaining a container set in layout calculation according to the embodiment of the present invention. For example, as shown in FIG. 11, four containers are laid out on a page, and association is set between the containers. In this case, containers A and B are associated by a link, whereas containers C and D are associated by a link. Containers A and B are specified as set 1, whereas containers C and D are specified as set 2. As described above, reference numeral 1101 denotes an anchor; 1102, a fixed edge; 1103, a controller; 1104, an arrow indicating a direction in which a flexible edge changes; 1105, a flexible edge; 1106, a link; and 1107, a slider.

The layout editing application 121 selects one of the container sets obtained in step S901 in order to calculate the layout (step S902). The layout editing application 121 calculates the layout for the selected container set. In the embodiment, the layout editing application 121 executes layout optimization as layout calculation so as to minimize the difference between the size (ideal size) of a laid-out container and the size (calculated size) of actual contents (step S903). The layout is optimized so that the difference between the layout size and the size of contents to be inserted into a container becomes equal between containers which are so associated as to dynamically change their sizes. The embodiment adopts the least-squares method. For example, when contents are inserted into a container, the difference between a calculated size (given by X) and an ideal size serving as a calculated value free from any constraints in position and size is calculated. A solution which minimizes the sum of the squares of differences is calculated to obtain the calculated size X.

After the layout editing application 121 optimizes the layout in step S903, it determines whether the layout violates the rules (step S904). If the layout editing application 121 determines that the layout violates the rules (NO in step S904), the flow returns to step S903 to perform layout optimization calculation again so as not to violate the rules. The rules for determination are constraints set by the user in creating a layout, and include constraints on the maximum and minimum sizes and position of each container, the length of a link, and the paper width. If the layout editing application 121 determines that the layout has been calculated not to violate the rules (YES in step S904), the layout of the target set is completed. The layout editing application 121 executes steps S902 to S904 described above for all sets on the page to calculate the layout of the entire page (step S905).

FIGS. 10A to 10C are views showing an example of UI display in performing the layout calculation process. FIG. 10A shows a state in which a given record is inserted and the layout is decided. In FIG. 10A, reference numerals 1001 and 1002 denote anchors; 1003 and 1004, fixed edges; 1005, a flexible edge; 1006, an arrow indicating a direction in which a flexible edge changes; and 1008, a link. In this state, a record is changed, and contents of different sizes are inserted.

FIG. 10B shows the size of new contents over the state of FIG. 10A. In FIG. 10B, reference numeral 1009 denotes the size of contents which are inserted into each container. In this state, the above-described layout calculation is executed. FIG. 10C shows the result of layout calculation. The sizes of the containers after layout calculation are so calculated as to have a difference, similar to the sizes of actually inserted contents, and not to violate the above-mentioned rules. As shown in FIG. 10C, the sizes 1009 of inserted contents in FIG. 10B have the same difference as that between calculated content sizes 1010.

[Setting of Flexible Link]

Figure 12:
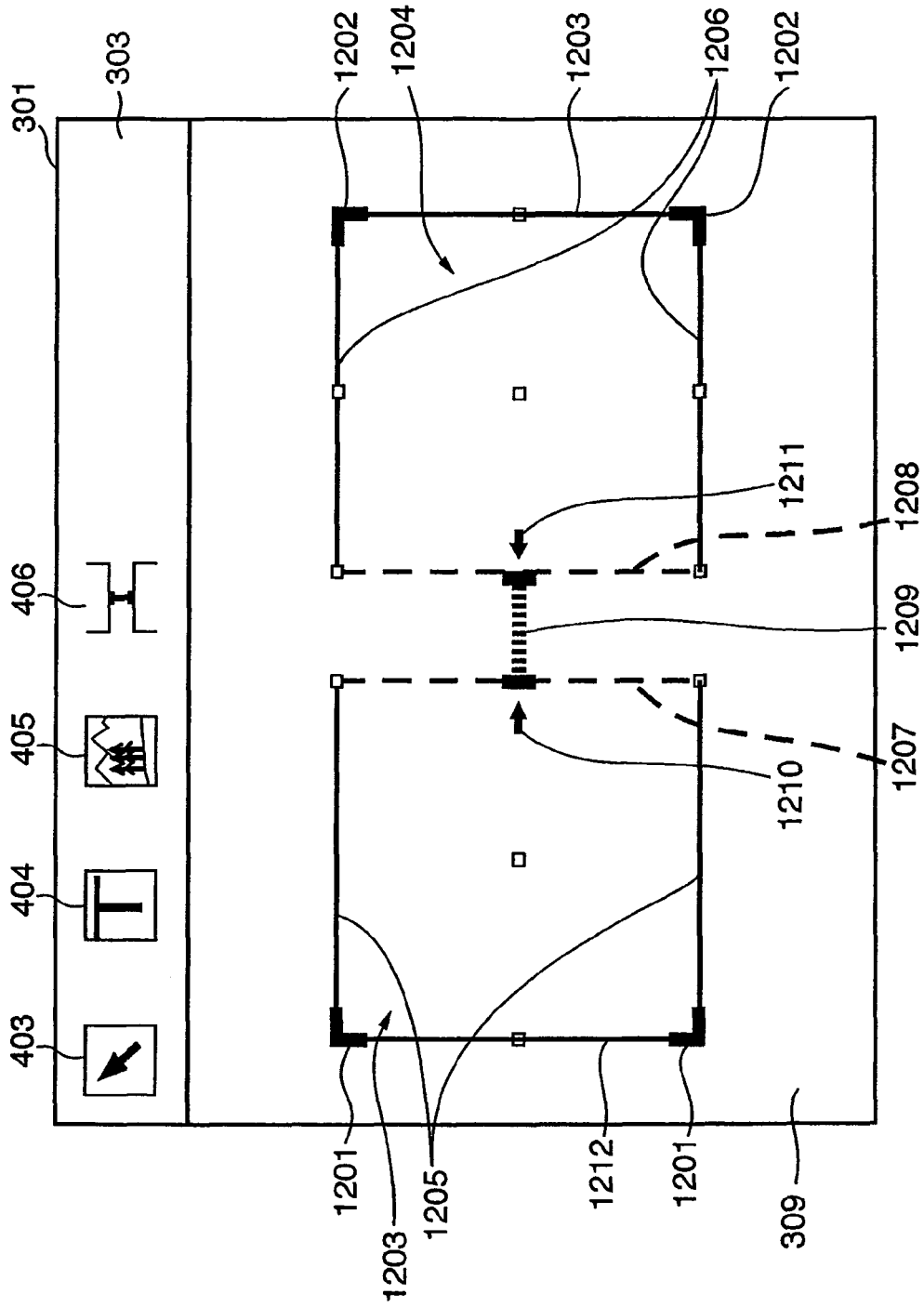
FIG. 12 is a view showing an example of a container layout using a flexible link according to the embodiment of the present invention.

FIG. 12 is a view showing an example of a container layout using a flexible link according to the embodiment of the present invention. In containers shown in FIG. 12, similar to those shown in FIG. 4, the application window 301 and tool bar 303 are provided, and containers 1203 and 1204 exist on the document template 309.

The container 1203 is made up of edges 1205 and 1212 fixed by an anchor icon 1205, and a flexible edge 1207. The container 1204 is made up of edges 1206 and 1213 fixed by an anchor icon 1202, and a flexible edge 1208. A flexible-size link 1209 is set between the containers 1203 and 1204 to link them. Since the link is set between the containers 1203 and 1204, a right edge 1207 of the container 1203 and a left edge 1208 of the container 1204 are represented in broken lines. An indicators 1210 is displayed on the container 1203, and an indicator 1211 is displayed on the container 1204. The indicators 1210 and 1211 represent that the edges 1207 and 1208 are flexible.

Figure 14:
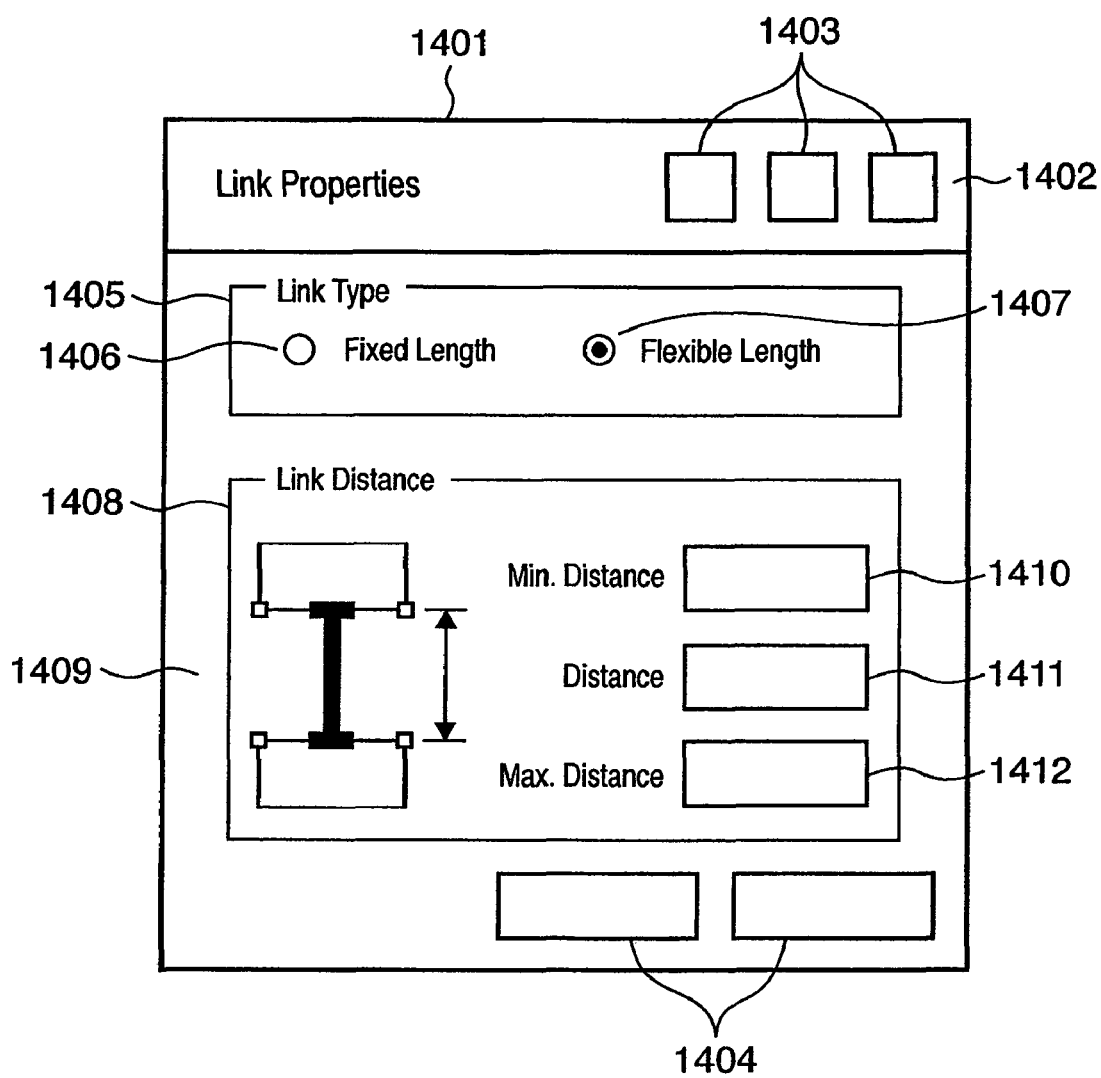
FIG. 14 is a view showing a dialog window 1401 for setting information on a link 1209 shown in FIG. 12.

FIG. 14 is a view showing a dialog window 1401 for setting information on the link 1209 shown in FIG. 12. The dialog shown in FIG. 14 is typically made up of a title bar 1402, a tool button 1403, a button 1404 for opening/closing the dialog window, and an area 1409 for setting various pieces of information. The dialog window 1401 allows selecting check boxes 1407 and 1406 for selecting whether the link type is set to a flexible or fixed length, and when the link type is set to a flexible length, setting a maximum value 1410, minimum value 1412, and current value 1411 of the link length.

Figure 13:
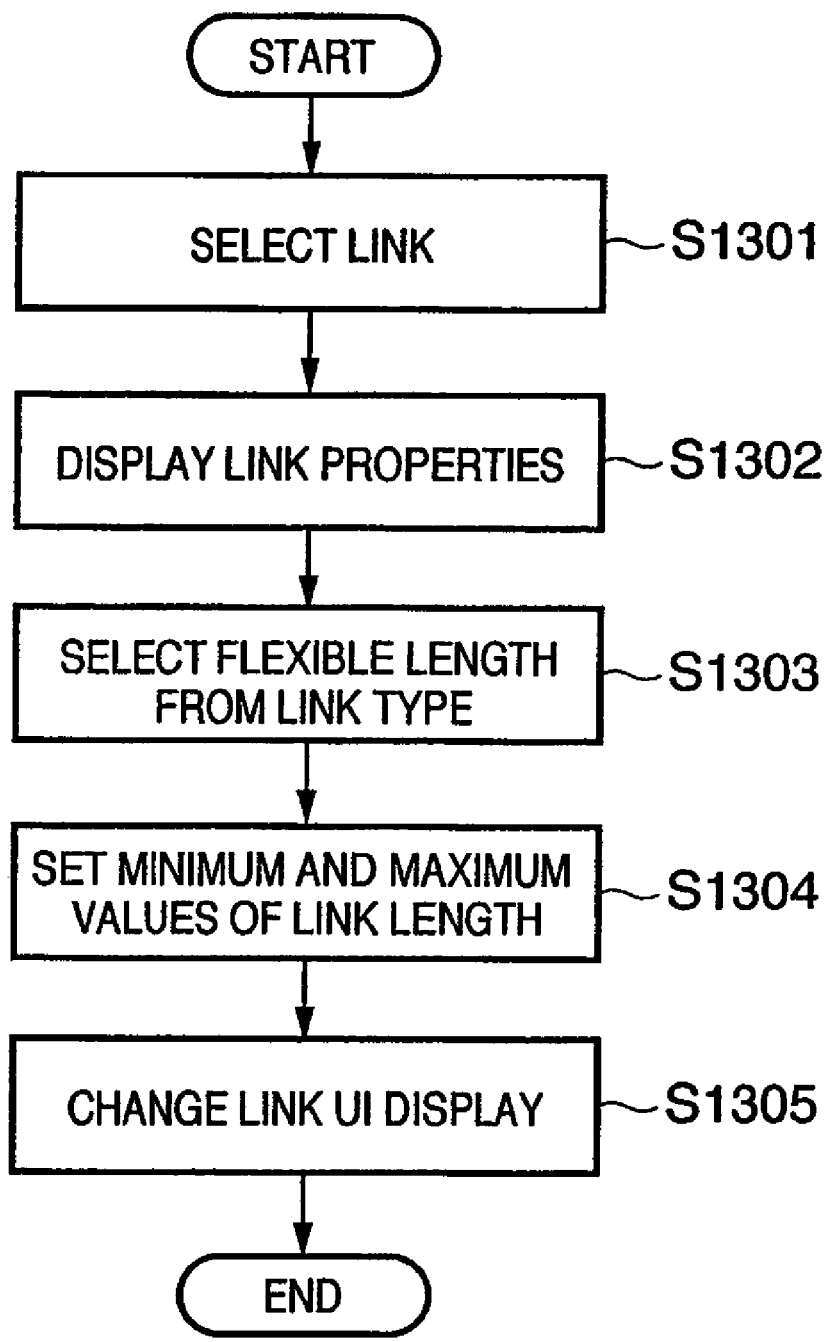
FIG. 13 is a flowchart for explaining a process of changing the operation from a fixed-size link state to a flexible-size link state according to the embodiment of the present invention.
Figure 15:
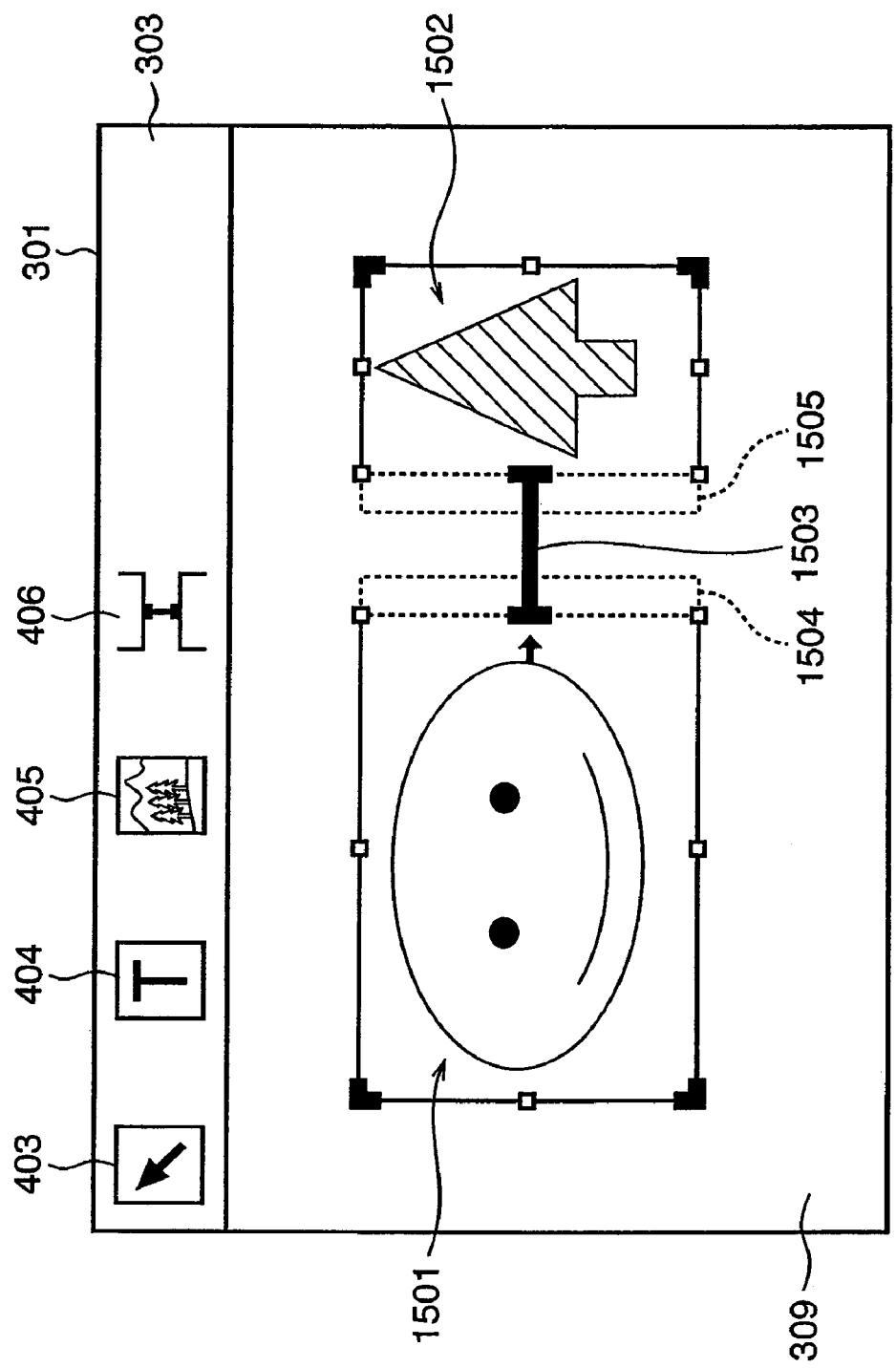
FIG. 15 is a view showing a layout result using a fixed link according to the embodiment of the present invention.

FIG. 13 is a flowchart for explaining a process of changing the operation from a fixed-size link state to a flexible-size link state according to the embodiment of the present invention. FIG. 15 is a view showing a layout result using a fixed link according to the embodiment of the present invention. A change of the operation from the state of a fixed-size link 1503 set between containers 1501 and 1502 shown in FIG. 15 to the state of FIG. 12 showing the flexible-size link 1209.

In FIG. 15, the link 1503 is clicked with a mouse to select the fixed link (step S1301). The property dialog window 1401 of the selected link 1503 is displayed by right clicking of the mouse or a specific key of the keyboard (step S1302). In this state, the link size is not flexible but is fixed, and the Fixed Length 1406 in FIG. 14 is selected in the Link Type 1405.

In order to change the link 1503 from the fixed size to a flexible size, the Flexible Length 1407 for setting a flexible link size is selected in the Link Type 1405 (step S1303). In response to this, the Max. Distance 1412, Min. Distance 1410, and Distance 1411 which are arranged in the Link Distance 1408 become effective, allowing setting of numerical values.

In order to set a flexible size of the link, the maximum value of the link length is set in the Max. Distance 1412, the minimum value is set in the Min. Distance 1410, and the current value is set in the Distance 1411 (step S1304). After the settings are applied by the general opening/closing button 1404, the link UI display is changed to a flexible state as indicated by the link 1209 in FIG. 12 (step S1305) Setting information of the dialog window 1401 is then stored in, e.g., the memory.

For example, when data of different sizes are inserted into the containers 1203 and 1204 shown in FIG. 12, each container changes to an optimal size on the basis of the data size. For example, the container 1203 enlarges to the right so as to move close to a frame 1504 (optimal container size) which corresponds to the size of the inserted image. Similarly, the container 1204 slightly increases its size to the left so as to move close to a frame 1505 (optimal container size) which corresponds to the size of the inserted image.

Assume that a fixed-size link is set between the containers 1203 and 1204. Since the containers 1203 and 1204 cannot move a left edge 1212 and right edge 1213 owing to the anchors 1201 and 1202, respectively, the changed sizes exceed the link size. In this case, the link size is fixed and thus preferentially calculated in layout calculation to change the sizes of the containers 1203 and 1204.

As a result, the containers 1203 and 1204 cannot ensure optimal sizes corresponding to the inserted data, and finally become smaller than the optimal sizes (container sizes expressed by the frames 1504 and 1505), like the containers 1501 and 1502 shown in FIG. 15. Since the size of the link 1503 is fixed, the containers 1501 and 1502 cannot achieve their optimal sizes.

Figure 16:
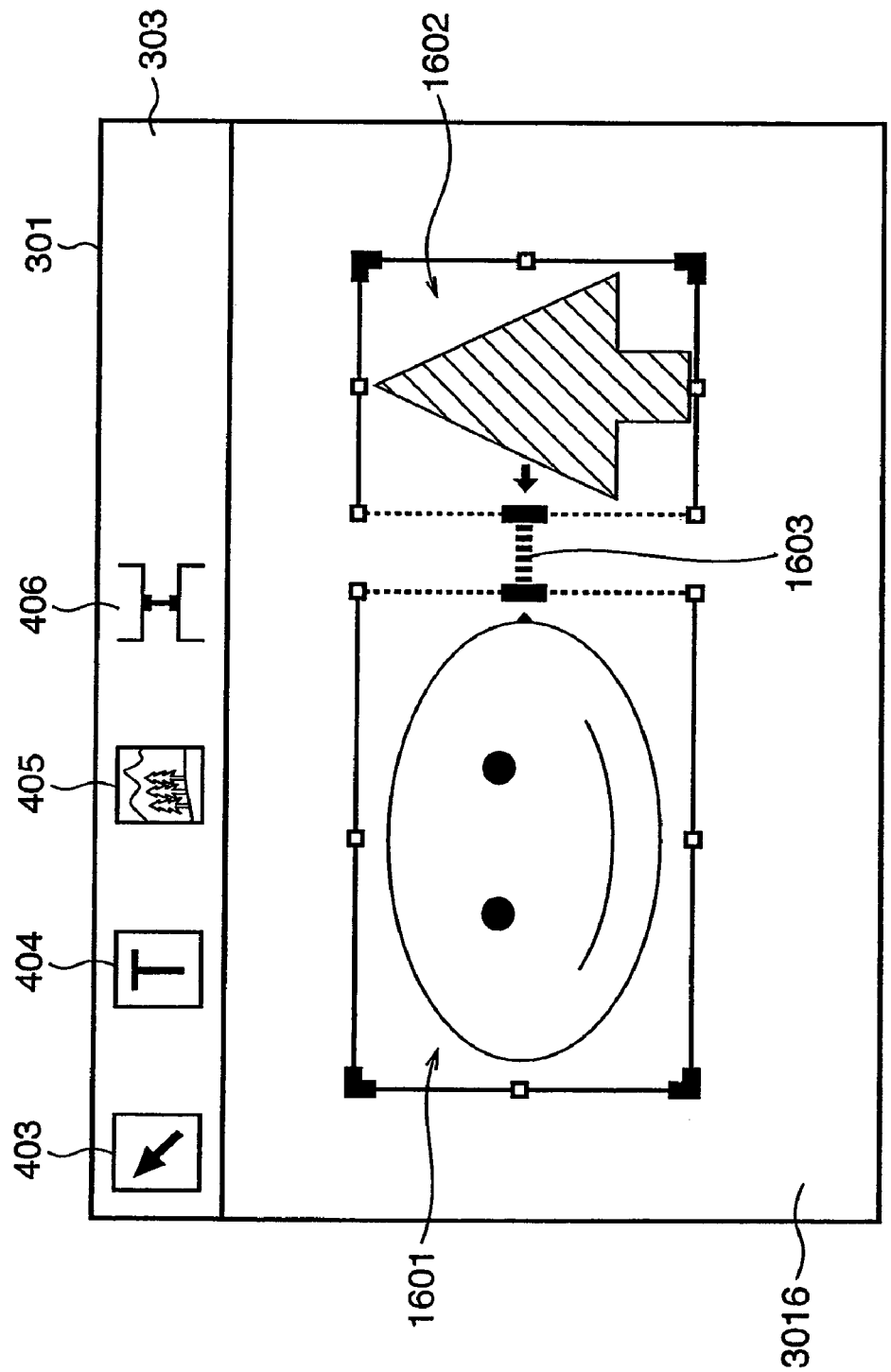
FIG. 16 is a view showing a layout result using a flexible link according to the embodiment of the present invention.

FIG. 16 is a view showing a layout result using a flexible link according to the embodiment of the present invention. FIG. 16 shows a case in which the link 1503 shown in FIG. 15 is changed to a flexible size. Assume that the flexible-size link 1209 is set between the containers 1203 and 1204 in the above example, as shown in FIG. 12. In this case, the sizes of the containers 1203 and 1204 can be increased (optimized), as described above, by decreasing the link size of the link 1209 when the sizes of the containers 1203 and 1204 are changed. A size optimal for the size of inserted data can be achieved, or a container frame close to the size (optimal size) of inserted data can be calculated.

Containers 1601 and 1602 in FIG. 16 are optimized ones. The flexible link 1209 shown in FIG. 12 is reduced to a state represented by a flexible link 1603 as a result of layout calculation. The containers 1601 and 1602 attain optimal sizes (sizes corresponding to their data sizes).

An example of the layout calculation process in the layout apparatus according to the embodiment of the present invention has been described. The above configuration can implement layout adjustment to decide the layout of a page to be formed on a print medium. More specifically, template data is managed which has a basic layout in which a plurality of partial areas (also called field areas) for inserting data are laid out in a page, as described above. The template data sets links between the partial areas, and changes the sizes of the partial areas in association with each other. The size of a partial area suitable to draw data to be inserted into the partial area is calculated on the basis of the size of this data. The layout representing the sizes and positions of partial areas in a page is adjusted on the basis of the relationship between the calculated size of each partial area and a link set between partial areas in the basic layout.

Further, the embodiment has a function (to be described below) of setting masking for a container which receives a document after the above-described layout adjustment.

[Masking Setting for Container]

The above-mentioned masking setting for a container has the following features.

Masking can be set for each container in the document template through an interactive GUI.

Masking can be set for each container by selecting whether or not to mask the container.

When the layout apparatus has a general user authentication function using a known technique, masking can be set for each container by selecting a user for whom no masking is set.

A method of setting masking for a container will be explained with reference to the accompanying drawings.

FIG. 19A is a view showing an example of a dialog window 1901 (mask attribute setting window) in which masking information for a container is set. As shown in FIG. 19A, the dialog has a title bar 1902, a tool button 1903, a button 1904 for opening/closing the dialog window, and an area 1905 for setting masking information. The dialog window 1901 can be used to set whether to mask a container (Enabled 1907) or not to mask it (Disabled 1906).

Figure 17:
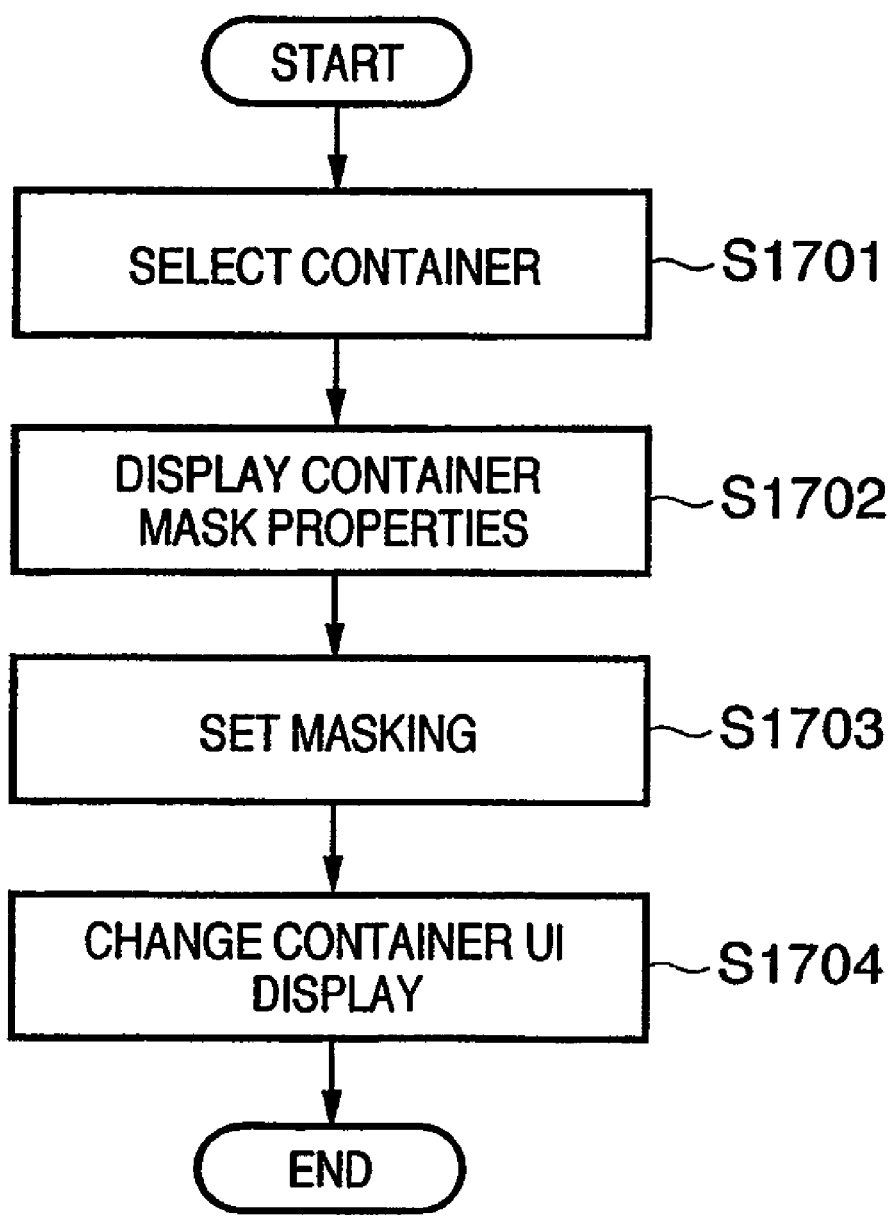
FIG. 17 is a flowchart for explaining a flow of operation to set masking for a container according to the embodiment of the present invention.

FIG. 17 is a flowchart for explaining a change of the operation to set masking setting for a container according to the embodiment of the present invention. More specifically, the flowchart shown in FIG. 17 shows a change of the operation until it is displayed that masking has been set, as shown in FIG. 18, after masking is set for, e.g., the container 1204 shown in FIG. 12 according to the above-mentioned container masking setting method.

Figure 18:
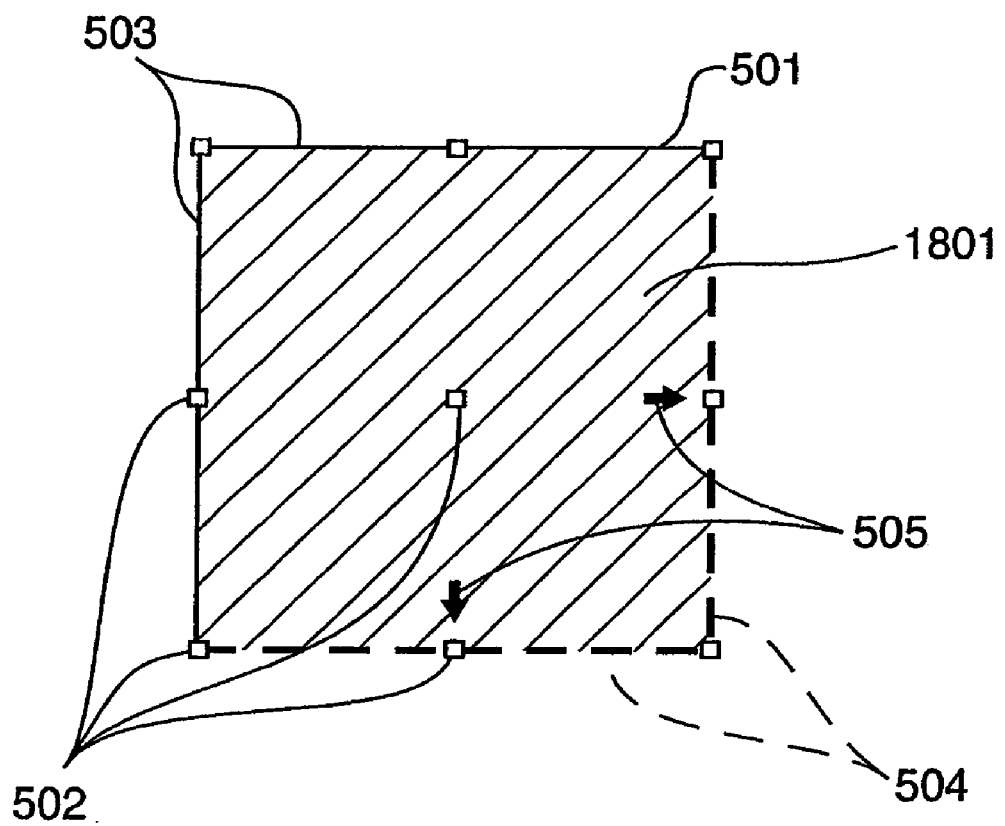
FIG. 18 is a view showing an example of a display UI for a masked container according to the embodiment of the present invention.

FIG. 18 is a view showing an example of a display UI for a masked container according to the embodiment of the present invention. More specifically, FIG. 18 shows an example in which the internal rectangular area of the container 501 shown in FIG. 5A is grayed out. The internal rectangular areas of the three remaining containers in FIGS. 5B to 5D are similarly grayed out to notify the user that masking has been set.

The user selects the container 1204 by clicking it with the mouse 133 or the like. Then, the layout editing application 121 recognizes the selected container (step S1701). The layout apparatus displays, on the display 144, the mask property dialog window 1901 (mask attribute setting window) for the container 1204 selected by right clicking of the mouse 133 or a specific key of the keyboard 132 (step S1702). In this state, it is set not "to mask a container", and the Disabled 1906 is selected in the Mask Configuration 1905 in FIG. 19A.

In order to change the setting from "not to mask a container" to "to mask a container", the layout editing application 121 accepts selection of the Enabled 1907 for setting "to mask a container" in the Mask Configuration 1905, as shown in FIG. 19A (step S1703). After the setting is applied with the general dialog window opening/closing button 1904, the UI display of the container 1204 is changed to the state of a container 1801 in FIG. 18 (step S1704). Note that setting information of the dialog window 1901 is stored in the memory.

Figure 19B:
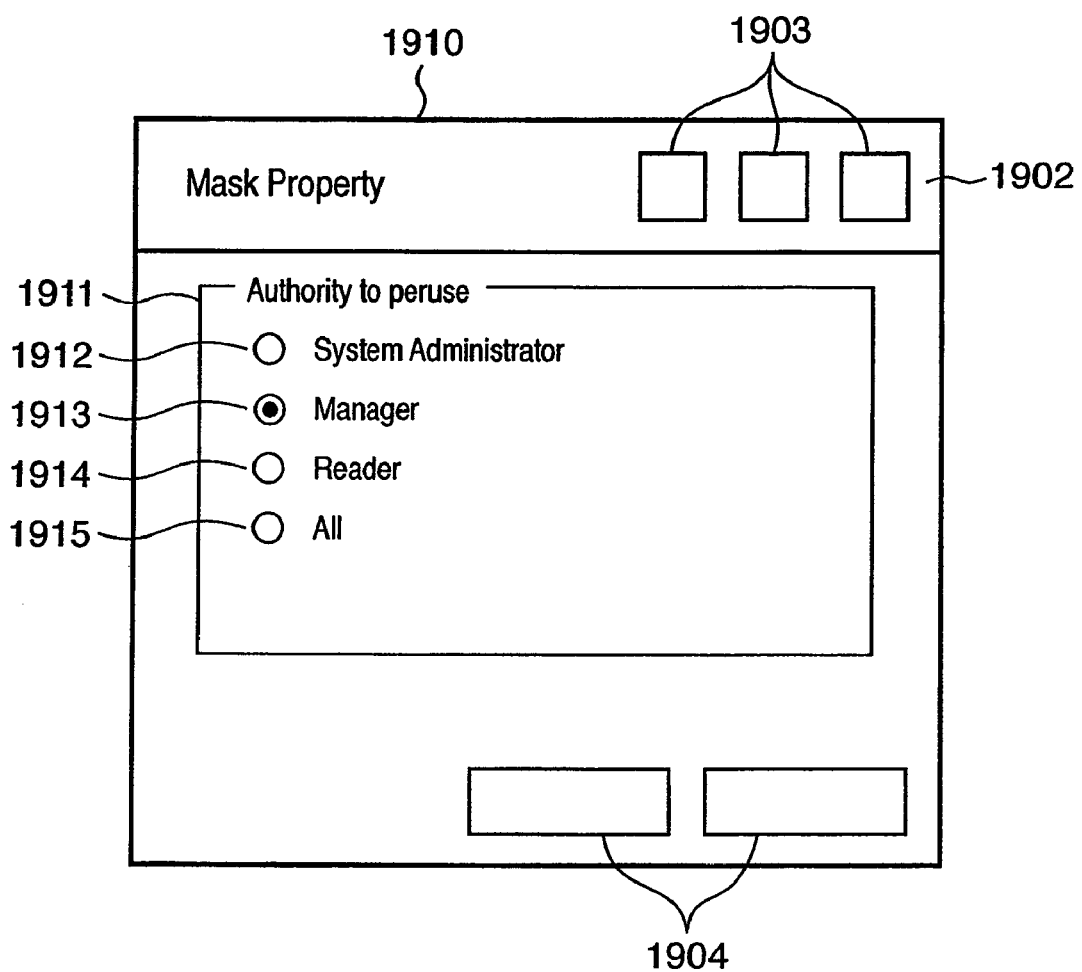
FIG. 19B is a view showing an example of a dialog window 1910 (mask perusal authority setting window) displayed by a layout apparatus having a general user authentication function using a known technique.

FIG. 19B is a view showing an example of a dialog window 1910 (mask perusal authority setting window) displayed by the layout apparatus having a general user authentication function using a known technique. This dialog is made up of the title bar 1902, the tool button 1903, the button 1904 for opening/closing the dialog window, and an area 1911 for setting masking information. In the example shown in FIG. 19B, masking setting for a container can be selected by check boxes given as a System Administrator 1912, Manager 1913, Reader 1914, and All 1915. These check boxes also specify a user who cannot do masking.

As described above, "not to mask a container" is selected in the embodiment, and the All 1915 is selected in the Authority to peruse 1911, as shown in FIG. 19B. In order to change the setting from "to mask a container" to "the user sets masking for Manager and others", the layout editing application 121 accepts selection of the Manager 1913 for setting a user corresponding to "not to mask a container" in the Authority to peruse 1911 (step S1703). After the setting is applied with the general dialog window opening/closing button 1904, the UI display of the container 1204 is changed to the state of the container 1801 in FIG. 18 (step S1704). Note that setting information of the dialog window 1901 is stored in the memory.

[Layout Method when Masking for Container is Effective (Overall Flow)]

Figure 20:
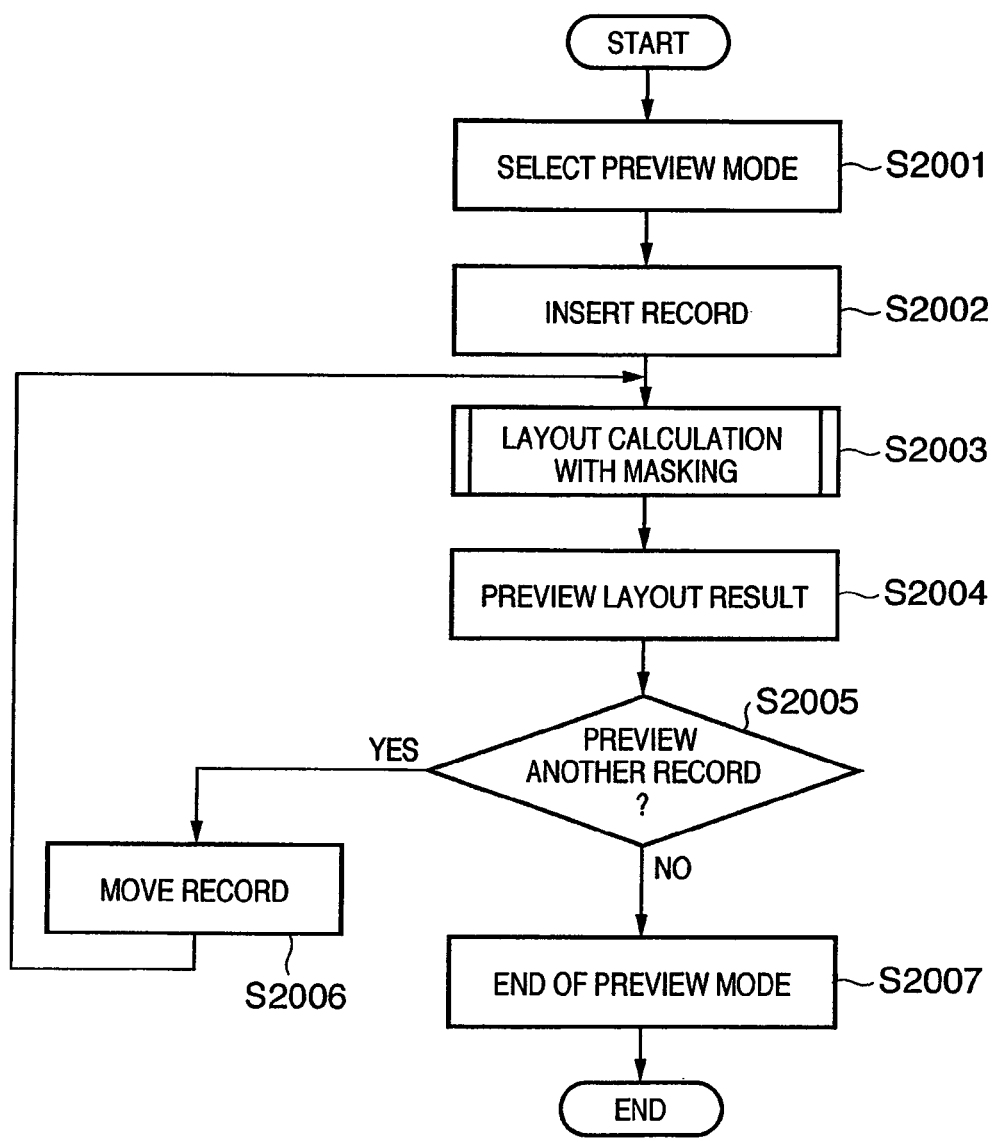
FIG. 20 is a flowchart for explaining a layout method control process in the layout editing application 121 when masking setting for a container is effective according to the embodiment of the present invention.

FIG. 20 is a flowchart for explaining a layout method control process in the layout editing application 121 when masking setting for a container is effective according to the embodiment of the present invention. This control flow explains a method of inserting (merging) the contents of each record from the database 119 and dynamically calculating the layout for the document template in accordance with the attribute of each container and the amount and size of contents. This flowchart describes control executed by the layout engine 105 of the layout editing application 121 using the processor 135 and memory 136.

The layout editing application 121 accepts selection of the preview mode (step S2001). The above-described automatic layout system has the layout mode in which containers are created and associated with each other to create a layout, and the preview mode in which a record is inserted into a created layout and a layout result to which the record is actually inserted is previewed. In the preview mode, an actual record is inserted, and the layout is calculated. In the preview mode, a layout for display is calculated. Also in actual printing, a record is inserted to calculate the layout. A calculation method in printing is also the same as that in the preview mode.

After the preview mode is set, the layout editing application 121 selects and inserts a record to be previewed (step S2002). When the user designates a specific record, the designated record is previewed. If the user does not designate any record, calculation starts sequentially from the first record. After the record is inserted, the layout editing application 121 performs calculation in order to lay out and mask the record (step S2003). Details of layout calculation with masking will be described with reference to FIG. 21. The layout editing application 121 previews the layout calculated in step S2003 (step S2004). The layout editing application 121 also determines whether to preview another record (step S2005).

If the layout editing application 121 determines not to preview another record (NO in step S2005), the preview mode ends (step S2007). If the layout editing application 121 determines to preview another record (YES in step S2005), it selects another record (step S2006). The layout editing application 121 returns to step S2003 to perform calculation for layout and masking again and preview the layout (step S2004).

In printing, unlike the preview mode, the layout editing application 121 performs calculation for layout and masking sequentially for all records to be printed. Hence, processes in steps S2005 and S2007 are omitted, and the process ends at the end of printing all records.

[Layout Method when Masking for Container is Effective (Detailed Flow)]

Figure 21:
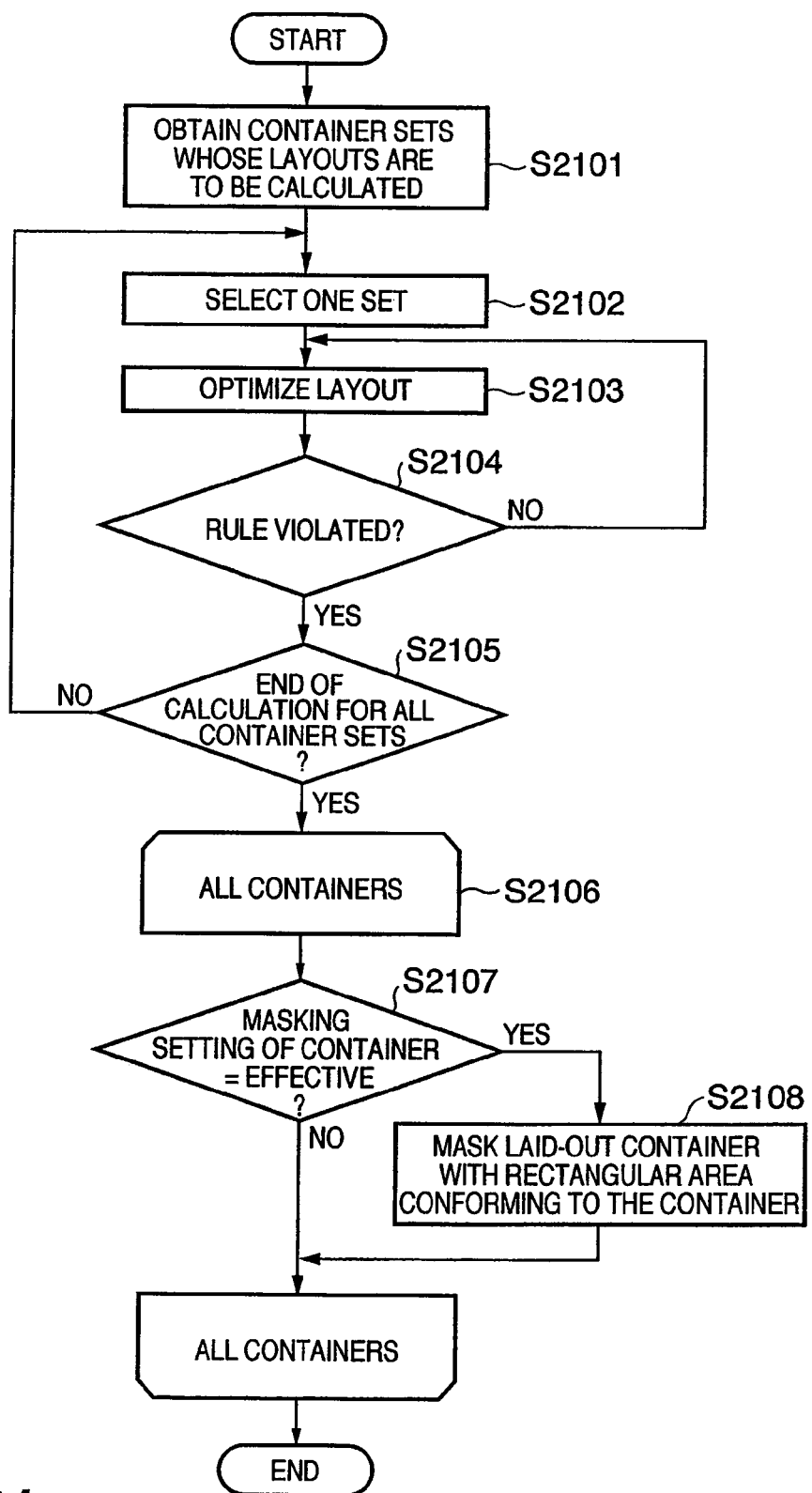
FIG. 21 is a flowchart for explaining details of a layout calculation process (step S2003) when masking setting for a container is effective in the flowchart of FIG. 20.

FIG. 21 is a flowchart for explaining details of the layout calculation process (step S2003) when masking setting for a container is effective in the flowchart of FIG. 20.

The layout editing application 121 obtains container sets whose layouts are to be calculated (step S2101). The layout is calculated for associated containers as one set. For example, referring to FIG. 11, four containers are laid out on a page, and association is set between the containers. In this case, containers A and B are associated by a link as are containers C and D. Containers A and B are specified as set 1, whereas containers C and D are specified as set 2. As described above, reference numeral 1101 denotes an anchor; 1102, a fixed edge; 1103, a controller; 1104, an arrow indicating a direction in which a flexible edge changes; 1105, a flexible edge; 1106, a link; and 1107, a slider.

The layout editing application 121 selects one of the container sets obtained in step S2101 in order to calculate the layout (step S2102). The layout editing application 121 calculates the layout for the selected container set (step S2103). In the embodiment, the layout editing application 121 optimizes the layout so as to minimize the difference between the size (ideal size) of a laid-out container and the size (calculated size) of actual contents. The layout is optimized so that the difference between the layout size and the size of contents to be inserted into a container becomes equal between containers which are so associated as to dynamically change their sizes. The embodiment adopts the least-squares method. For example, when contents are inserted into a container, the difference between a calculated size (given by X) and an ideal size serving as a calculated value free from any constraints in position and size is calculated. A solution which minimizes the sum of the squares of differences is calculated to obtain the calculated size X.

After the layout editing application 121 optimizes the layout in step S2103, it determines whether the layout violates the rules (step S2104). If the layout editing application 121 determines that the layout violates the rules (NO in step S2104), the flow returns to step S2103 to perform layout optimization calculation again so as not to violate the rules. The rules are constraints set by the user in creating a layout, and include constraints on the maximum and minimum sizes and position of each container, the length of a link, and the paper width.

If the layout editing application 121 determines that the layout does not violate the rules (YES in step S2104), the layout of the target set is completed. The layout editing application 121 executes processes in steps S2102 to S2104 described above for all sets on the page to calculate the layout of the entire page (step S2105).

The layout editing application 121 repetitively reads out the setting of "to mask a container" or "not to mask a container" for all containers (step S2106). The layout editing application 121 acquires masking setting for a target container, and determines whether the container has the setting of "to mask a container" (step S2107). If the container has the setting of "to mask a container" (YES in step S2107), the layout editing application 121 creates a rectangular area equal in size and position to a laid-out container, and fills the area to mask it (step S2108). If the layout editing application 121 determines that the container does not have the setting of "to mask a container" (NO in step S2107), it processes the next container.

Figure 23:
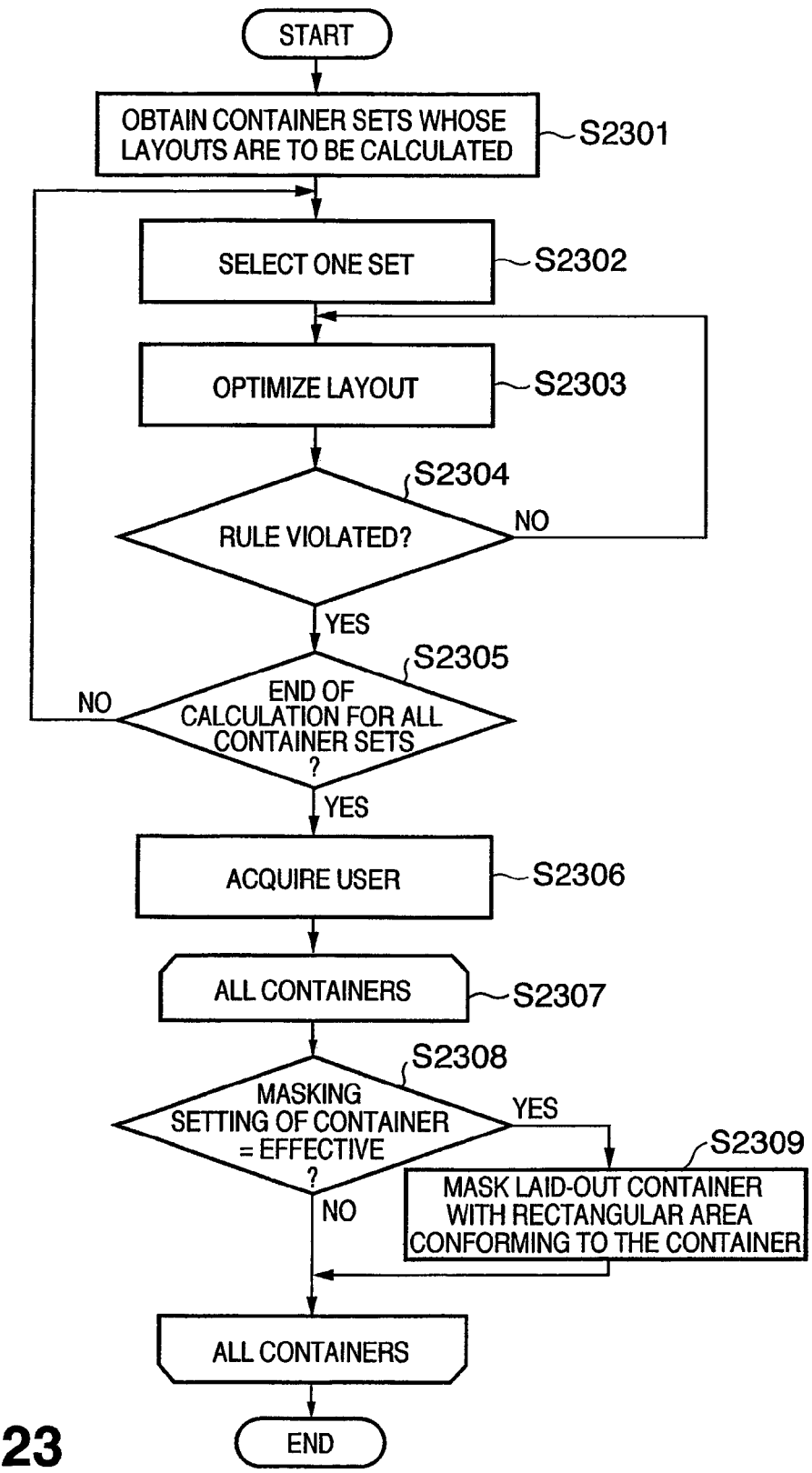
FIG. 23 is a flowchart for explaining details of layout calculation when masking for a container by the layout apparatus having the general user authentication function is effective according to the embodiment of the present invention.

FIG. 23 is a flowchart for explaining details of layout calculation when masking for a container by the layout apparatus having the general user authentication function is effective according to the embodiment of the present invention. The layout editing application 121 obtains container sets whose layouts are to be calculated (step S2301). The layout is calculated for associated containers as one set.

For example, referring to FIG. 11, four containers are laid out on a page, and association is set between the containers. In this case, containers A and B are associated by a link as are containers C and D. Containers A and B are specified as set 1, whereas containers C and D are specified as set 2. As described above, reference numeral 1101 denotes an anchor; 1102, a fixed edge; 1103, a controller; 1104, an arrow indicating a direction in which a flexible edge changes; 1105, a flexible edge; 1106, a link; and 1107, a slider.

The layout editing application 121 selects one of the container sets obtained in step S2301 in order to calculate the layout (step S2302). The layout editing application 121 calculates the layout for the selected container set (step S2303). At this time, the layout editing application 121 optimizes the layout so as to minimize the difference between the size (ideal size) of a laid-out container and the size (calculated size) of actual contents. The layout is optimized so that the difference between the layout size and the size of contents to be inserted into a container becomes equal between containers which are so associated as to dynamically change their sizes. The embodiment adopts the least-squares method. For example, when contents are inserted into a container, the difference between a calculated size (given by X) and an ideal size serving as a calculated value free from any constraints in position and size is calculated. A solution which minimizes the sum of the squares of differences is calculated to obtain the calculated size X.

After the layout editing application 121 optimizes the layout, it determines whether the layout violates the rules (step S2304). If the layout editing application 121 determines that the layout violates the rules (NO in step S2304), the flow returns to step S2303 to perform optimization calculation again so as not to violate the rules. The rules used are constraints set by the user in creating a layout, and include constraints on the maximum and minimum sizes and position of each container, the length of a link, and the paper width.

If the layout editing application 121 determines that the layout has been calculated not to violate the rules (YES in step S2304), the layout of the target set is completed. The layout editing application 121 executes processes in steps S2302 to S2304 for all sets on the page to calculate the layout of the entire page (step S2305). The layout editing application 121 acquires a user who executes the layout process (step S2306).

The layout editing application 121 repetitively reads out settings of users corresponding to "not to mask a container" for all containers (step S2307). The layout editing application 121 compares a user who performs the layout process with a user having the setting of "not to mask a container" which is acquired from masking setting of a container, and determines whether to mask a container (step S2308). If the layout editing application 121 determines "to mask a container" (YES in step S2308), it creates a rectangular area equal in size and position to a laid-out container, and fills the area to mask it (step S2309). If the layout editing application 121 does not determine "to mask a container" (NO in step S2308), it processes the next container.

[Display of Layout Result when Masking for Container is Effective]

Figure 22:
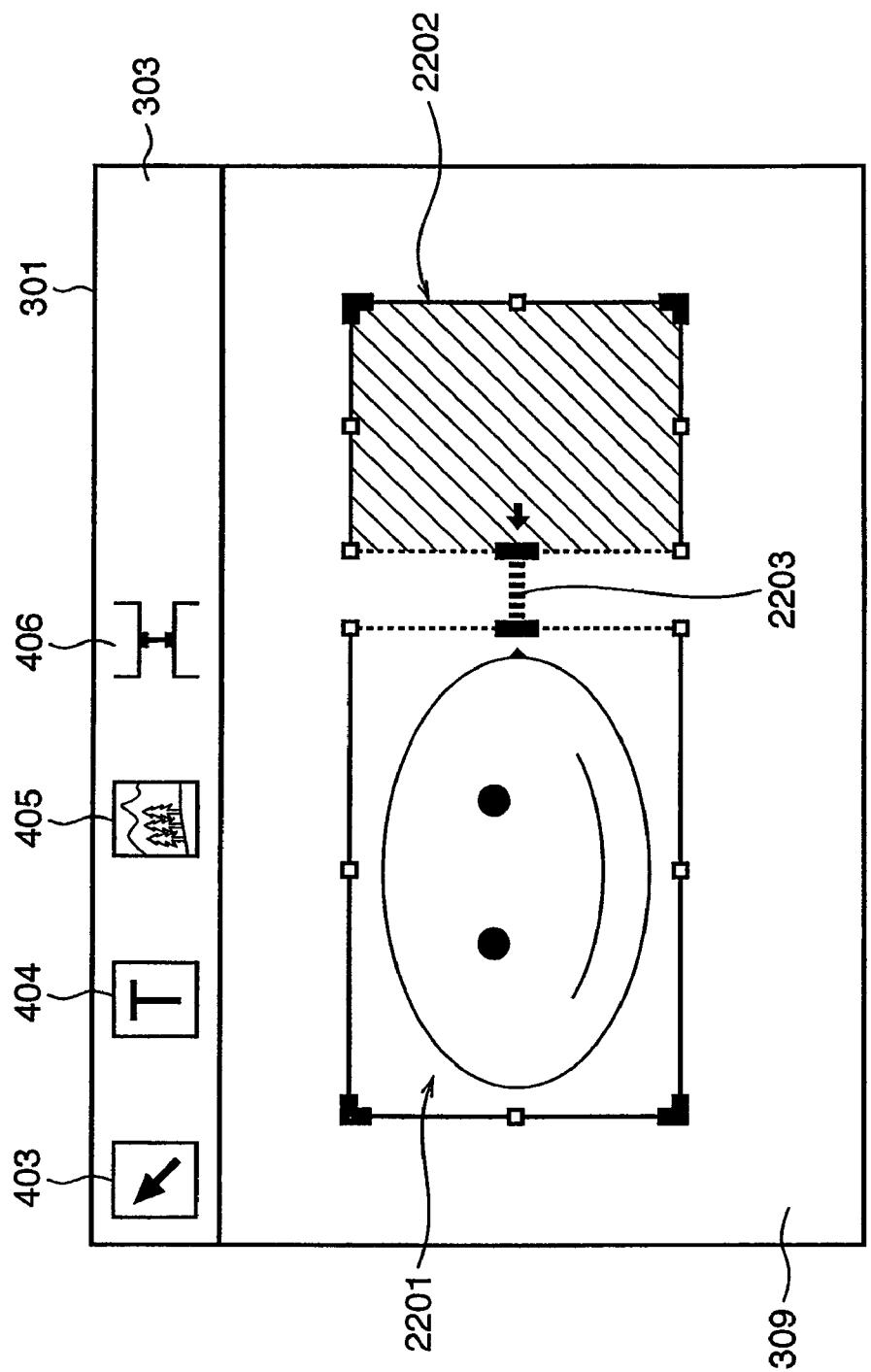
FIG. 22 is a view showing a layout result when masking setting for a container is effective and a link is changed to a flexible size in the layout apparatus according to the embodiment of the present invention.

FIG. 22 is a view showing a layout result when masking setting for a container is effective and a link is changed to a flexible size in the layout apparatus according to the embodiment of the present invention. Assume that "to mask a container" is set for the container 1204, and the flexible-size flexible link 1209 is set between the containers 1203 and 1204, as described above. In this case, when the sizes of the containers 1203 and 1204 are changed, they can be made larger than those in the above example by decreasing the link size. A size optimal for the size of inserted data can be achieved, or a container frame close to the size (optimal size) of inserted data can be calculated.

The result of layout calculation is represented by containers 2201 and 2202 shown in FIG. 22. As shown in FIG. 22, the flexible link 1209 is changed to a size represented by a flexible link 2203 as a result of layout calculation. In this case, the containers 2201 and 2202 attain optimal sizes (sizes corresponding to their data sizes). The container 2202 having the setting of "to mask a container" is masked by filling it with a rectangle equal in size to the resized container 2202. As described above, the masking process for a laid-out container can be preferably done in a variable printing apparatus capable of displaying and printing document data prepared by inserting designated variable data into a designated area, as described above.

With the above configuration, it is determined whether masking is set for each of layout-adjusted partial areas. When a partial area has masking setting, a mask area equal in shape to the partial area is created. The partial area having masking setting can be covered with the created mask area.

The embodiment has been described in detail. The present invention can be implemented as a system, apparatus, method, program, storage medium (recording medium), or the like. More specifically, the present invention may be applied to a system including a plurality of devices or an apparatus formed by a single device.

The present invention is also achieved by supplying a software program (in the embodiment, a program corresponding to the flowcharts shown in the drawings) for implementing the functions of the above-described embodiment to a system or apparatus directly or from a remote place, and reading out and executing the supplied program codes by the computer of the system or apparatus.

The present invention is therefore implemented by program codes themselves installed in the computer in order to implement functional processes of the present invention by the computer. That is, the present invention includes a computer program itself for implementing functional processes of the present invention.

In this case, the present invention may take the form of an object code, a program executed by an interpreter, or script data supplied to an OS as long as a program function is attained.

Examples of a recording medium for supplying the program are a Floppy® disk, hard disk, optical disk, magnetooptical disk, MO, CD-ROM, CD-R, CD-RW, magnetic tape, nonvolatile memory card, ROM, and DVD (DVD-ROM and DVD-R).

As another program supply method, the program can be supplied by connecting a client computer to an Internet Web page via the browser of the client computer, and downloading the computer program of the present invention or a compressed file containing an automatic installing function from the Web page to a recording medium such as a hard disk. The program can also be implemented by grouping program codes which form the program of the present invention into a plurality of files, and downloading the files from different Web pages. That is, the present invention also includes a WWW server which allows a plurality of users to download the program files for implementing functional processes of the present invention by a computer.

The program of the present invention can be encrypted, stored in a recording medium such as a CD-ROM, and distributed to the user. A user who satisfies predetermined conditions is prompted to download decryption key information from a Web page via the Internet. The user executes the encrypted program by using the key information, and installs the program in the computer.

The functions of the above-described embodiment are implemented when the computer executes the readout program codes. Also, the functions of the above-described embodiment are implemented when an OS or the like running on the computer performs some or all of actual processes on the basis of the instructions of the program codes.

The functions of the above-described embodiment are implemented when the program read out from the recording medium is written in the memory of a function expansion board inserted into the computer or the memory of a function expansion unit connected to the computer, and the CPU of the function expansion board or function expansion unit performs some or all of actual processes on the basis of the instructions of the program codes.

As has been described above, a container can be preferably hidden by performing masking corresponding to a template whose layout is decided in accordance with the size of contents pasted within the container in variable data printing.

As many apparently widely different embodiments of the present invention can be made without departing from the spirit and scope thereof, it is to be understood that the invention is not limited to the specific embodiments thereof except as defined in the appended claims.

This application claims the benefit of Japanese Application No. 2005-023934, filed on Jan. 31, 2005, which is hereby incorporated by reference herein in its entirety.

What is claimed is:

1. A layout decision method executed in a layout decision apparatus that generates a document based on a template, the template including a plurality of field areas, contents data being input into a field area of the plurality of field areas from a record, the method comprising the steps of:
    setting a link which associates the plurality of field areas in the template with each other;
    deciding a position and size of the field area by calculating based on a size of the contents data to be input into the field area;
    determining whether or not a mask is set to the decided field area;
    creating a mask for covering the decided field area in the case where it is determined that the mask is set to the decided field area; and
    covering the decided field area with the created mask,
    wherein the size of the field area is decided to be optimized such that each size difference between a size of the contents data to be input into the field area and a calculated size of the field area is equal to each other among the plurality of field areas,
    wherein the size of the field area is decided based on calculating an optimized size difference between an ideal size of the field area and the calculated size of the field area, and
    wherein the optimized size difference corresponds to a minimum sum of squares of each size difference and
    wherein the ideal size is a size of the field area in the case where the contents data is input into the field area without any constraint regarding a position and size of the field area.

2. The method according to claim 1, further comprising the step of:
    displaying, on a display device, the document in which the decided field area is covered with the created mask.

3. The method according to claim 1, further comprising the step of:
    authenticating an operator who operates the document,
    wherein the mask is determined to be set to the decided field area based on the authenticated operator.

4. The method according to claim 1, further comprising the step of
    executing a printing process to print, on a print medium, the document in which the decided field area is covered with the created mask.

5. An apparatus comprising at least one processor which executes a program stored in a memory, wherein the at least one processor functions to control the apparatus to generate a document based on a template, the template including a plurality of field areas, contents data being input into a field area of the plurality of field areas from a record, the apparatus further comprising:
    a setting unit configured to set a link which associates the plurality of field areas in the template with each other;
    a decision unit configured to decide a position and size of the field area by calculating based on a size of the contents data to be input into the field area;
    a determining unit configured to determine whether or not a mask is set to the decided field area;
    a creating unit configured to create a mask for covering the decided field area in the case where it is determined that the mask is set to the decided field area; and
    a covering unit configured to cover the decided field area with the created mask,
    wherein the size of the field area is decided to be optimized such that each size difference between a size of the contents data to be input into the field area and a calculated size of the field area is equal to each other among the plurality of field areas, wherein the size of the field area is decided based on calculating an optimized size difference between an ideal size of the field area and the calculated size of the field area, and
    wherein the optimized size difference corresponds to a minimum sum of squares of each size difference and
    wherein the ideal size is a size of the field area in the case where the contents data is input into the field area without any constraint regarding a position and a size of the field area.

6. The apparatus according to claim 5, further comprising a display device displaying the document in which the decided field area is covered with the created mask.

7. The apparatus according to claim 5, further comprising:
    an authenticating unit configured to authenticate an operator who operates the document,
    wherein the mask is determined to be set to the decided field area based on the authenticated operator.

8. The apparatus according to claim 5, further comprising:
an executing unit configured to execute a printing process to print, on a print medium, the document in which the decided field area is covered with the created mask.

9. A non-transitory computer-readable storage medium for storing a layout decision program that causes a computer to execute a method that generates a document based on a template, the template including a plurality of field areas, contents data being input into a field area of the plurality of field areas from a record, the method comprising the steps of:
setting a link which associates the plurality of field areas in the template with each other;
deciding a position and size of the field area by calculating based on a size of the contents data to be input into the field area;
determining whether or not a mask is set to the decided field area;
creating a mask for covering the decided field area in the case where it is determined that the mask is set to the decided field area; and
covering the decided field area with the created mask,
wherein the size of the field area is decided to be optimized such that each size difference between a size of the contents data to be input into the field area and a calculated size of the field area is equal to each other among the plurality of field areas,
wherein the size of the field area is decided based on calculating an optimized size difference between an ideal size of the field area and the calculated size of the field area, and
wherein the optimized size difference corresponds to a minimum sum of squares of each size difference and
wherein the ideal size is a size of the field area in the case where the contents data is input into the field area without any constraint regarding a position and size of the field area.

10. The non-transitory computer-readable storage medium according to claim 9, further comprising the step of:
displaying, on a display device, the document in which the decided field area is covered with the created mask.

11. The non-transitory computer-readable storage medium according to claim 9, further comprising the step of:
authenticating an operator who operates the document,
wherein the mask is determined to be set to the decided field area based on the authenticated operator.

12. The non-transitory computer-readable storage medium according to claim 9, further comprising the step of:
executing a printing process to print, on a print medium, the document in which the decided field area is covered with the created mask.

* * * * *